United States Patent
Dabral et al.

(10) Patent No.: US 11,057,573 B2
(45) Date of Patent: Jul. 6, 2021

(54) MULTI CAMERA IMAGE PROCESSING

(71) Applicant: TEXAS INSTRUMENTS INCORPORATED, Dallas, TX (US)

(72) Inventors: Shashank Dabral, Allen, TX (US); Gang Hua, Katy, TX (US); Mayank Mangla, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/226,085

(22) Filed: Dec. 19, 2018

(65) Prior Publication Data

US 2019/0191106 A1 Jun. 20, 2019

Related U.S. Application Data

(60) Provisional application No. 62/608,452, filed on Dec. 20, 2017.

(51) Int. Cl.
*H04N 5/265* (2006.01)
*H04N 5/247* (2006.01)
(Continued)

(52) U.S. Cl.
CPC ............. *H04N 5/265* (2013.01); *G06T 7/80* (2017.01); *G06T 7/90* (2017.01); *H04N 5/2258* (2013.01);
(Continued)

(58) Field of Classification Search
CPC ...... H04N 5/265; H04N 5/2258; H04N 5/232; H04N 5/23238; H04N 5/2351;
(Continued)

(56) References Cited

U.S. PATENT DOCUMENTS 8,135,068 B1 3/2012 Alvarez et al.
8,811,811 B1 * 8/2014 Wetzel ................ H04N 5/2355
396/322
(Continued)

FOREIGN PATENT DOCUMENTS

CN 107197207 A 9/2017
WO 2017125779 A 7/2017

OTHER PUBLICATIONS

International Search Report and Written Opinion, dated Apr. 18, 2019, PCT Application No. PCT/US2018/066875, 7 pages.

(Continued)

*Primary Examiner* — Antoinette T Spinks
(74) *Attorney, Agent, or Firm* — Ebby Abraham; Charles A. Brill; Frank D. Cimino

(57) ABSTRACT

A system on a chip (SoC) implementing dynamic grouping of multiple cameras in an image processing system is disclosed. The SoC includes an image signal processor (ISP) configured to receive a signal corresponding to an image from two or more cameras, dynamically group the cameras into groups based on a measured view brightness and/or color temperature observed by each of the cameras, and assign cameras with a group of the groups to a same exposure/gain setting. The SoC further includes a statistics engine configured to receive the image signals and statistics related to the image signals from the ISP and determine a measurement of image brightness and/or color temperature of each image based on the image signals for forwarding to the ISP.

17 Claims, 14 Drawing Sheets

(51) Int. Cl.

| | | |
|---|---|---|
| | *G06T 7/80* | (2017.01) |
| | *H04N 5/235* | (2006.01) |
| | *H04N 5/268* | (2006.01) |
| | *G06T 7/90* | (2017.01) |
| | *H04N 5/232* | (2006.01) |
| | *H04N 9/04* | (2006.01) |
| | *H04N 5/225* | (2006.01) |

(52) U.S. Cl.
CPC ........... *H04N 5/232* (2013.01); *H04N 5/2351* (2013.01); *H04N 5/23238* (2013.01); *H04N 5/247* (2013.01); *H04N 5/268* (2013.01); *H04N 9/045* (2013.01); *H04N 5/2352* (2013.01)

(58) Field of Classification Search
CPC ...... H04N 5/247; H04N 5/268; H04N 5/2352; H04N 9/045; G06T 7/80; G06T 7/90
See application file for complete search history.

(56) References Cited

U.S. PATENT DOCUMENTS

| | | | |
|---|---|---|---|
| 10,373,322 B1* | 8/2019 | Buibas | G06K 9/00369 |
| 10,586,208 B2* | 3/2020 | Buibas | G06K 9/00771 |
| 2010/0194918 A1 | 8/2010 | Zhang et al. | |
| 2012/0301039 A1 | 11/2012 | Maunder et al. | |
| 2014/0241620 A1 | 8/2014 | Zhang et al. | |
| 2014/0327774 A1 | 11/2014 | Lu et al. | |
| 2015/0116534 A1 | 4/2015 | Kim | |
| 2015/0138312 A1 | 5/2015 | Liu et al. | |
| 2016/0191815 A1 | 6/2016 | Annau et al. | |
| 2016/0248987 A1* | 8/2016 | Zilly | H04N 5/2356 |
| 2017/0195564 A1 | 7/2017 | Appia et al. | |
| 2017/0329775 A1 | 11/2017 | Honjo | |
| 2018/0115694 A1* | 4/2018 | Choi | H04N 5/247 |

OTHER PUBLICATIONS

Extended European Search Report; Application No. 18892177.9-1208/3729803; PCT/US2018066875; dated Oct. 1, 2020.

* cited by examiner

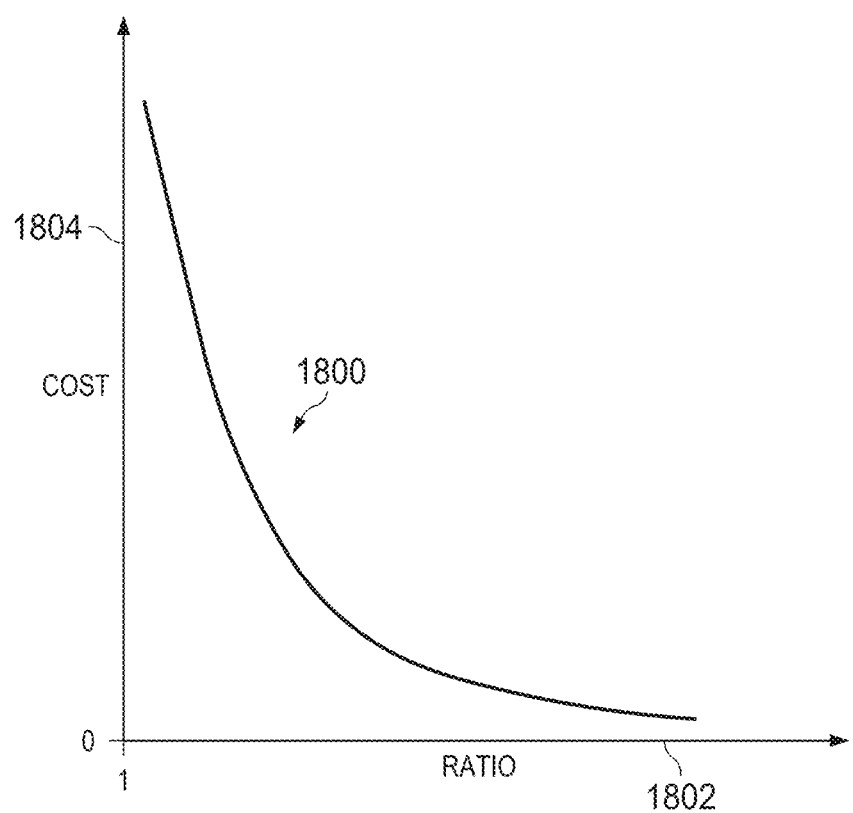
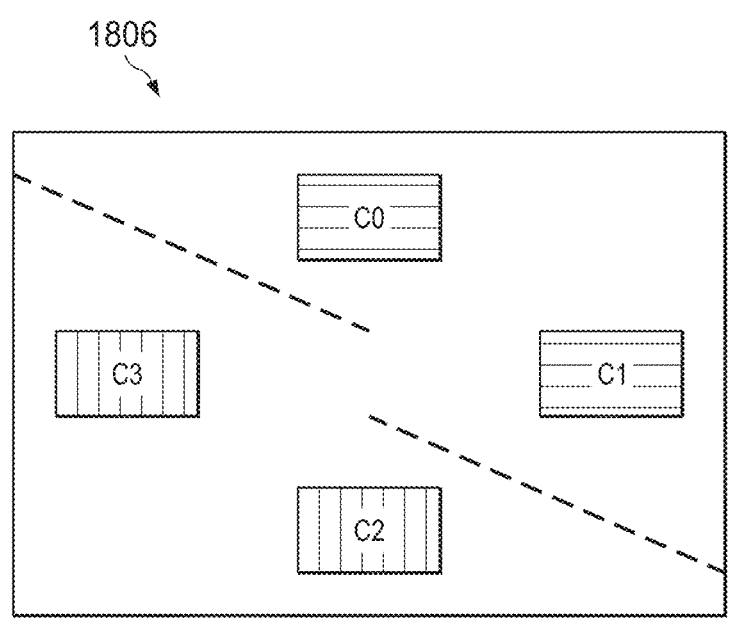
FIG. 18

MULTI CAMERA IMAGE PROCESSING

RELATED APPLICATIONS

This application claims priority from U.S. Provisional Application No. 62/608,452, filed 20 Dec. 2017, which is incorporated herein in its entirety.

TECHNICAL FIELD

This relates to image processing systems, or more particularly to a preprocessing scheme for multi camera harmonization in image processing applications.

BACKGROUND

Image processing systems such as surround view systems combine an image from images received from multiple cameras. In an example, a vehicle surround view system is used to implement a parking assistance application, where there are four cameras placed at various positions throughout the vehicle in order to cover the entire field of view around the vehicle. The system forms a combined image from the images taken from the multiple cameras. The combined image is used to for example gather information about potential obstacles around the vehicle.

SUMMARY

This disclosure relates to a system and method to implement a preprocessing scheme for multi camera harmonization in image processing applications.

In one example, a system on a chip (SoC) implementing an image processing system is disclosed. The SoC includes an image signal processor (ISP) configured to receive a signal corresponding to an image from two or more cameras, dynamically group the cameras into groups based on a measured view brightness and/or color temperature observed by each of the cameras, and assign cameras with a group of the groups to a same exposure/gain setting. The SoC further includes a statistics engine configured to receive the image signals and statistics related to the image signals from the ISP and determine a measurement of image brightness and/or color temperature of each image based on the image signals for forwarding to the ISP.

In another example, a method to implement an image processing system by dynamically grouping two or more cameras is disclosed. The method includes estimating, by a statistics engine, a view brightness and/or color temperature of each camera within a two or more camera image processing system. The method further includes grouping, by an image signal processor (ISP), the two or more cameras into one or more groups based on a spread of the estimated view brightness and/or color temperature among the two or more cameras, wherein the spread is calculated by determining a least measured view brightness and/or color temperature of the two or more cameras and a greatest measured view brightness and/or color temperature of the two or more cameras. The method further includes selecting, by the ISP, a camera exposure/gain setting for each group, wherein one or more cameras within a given one of the groups has a same camera exposure/gain setting.

In yet another example, a method to implement an image processing system by dynamically grouping two or more cameras is disclosed. The method includes estimating, by a statistics engine, a view brightness and/or color temperature of each camera within a two or more camera image processing system. The method further includes defining, by an image signal processor (ISP), a plurality of ways that the two or more cameras are allowed to be grouped. The method further includes defining, by the ISP, one or more cost functions for the plurality of ways of grouping. The method further includes computing, by the ISP, costs for each of the plurality of ways the cameras are allowed to be grouped based on the one or more cost functions. The method further includes grouping, by the ISP, the cameras into one or more groups to curtail the costs, wherein the costs define an extent to which image harmonization and dynamic range are balanced within a synthesized image. The method further includes selecting, by the ISP, a camera exposure/gain setting for each group, wherein one or more cameras within a given one of the groups has a same camera exposure/gain setting. The method further includes rendering, to a display, the synthesized image that blends images captured by the cameras of the two or more camera image processing system.

BRIEF DESCRIPTION OF THE DRAWINGS

FIG. 18 illustrates an example cost function for low brightness change across groups.

DETAILED DESCRIPTION

Figure 1:
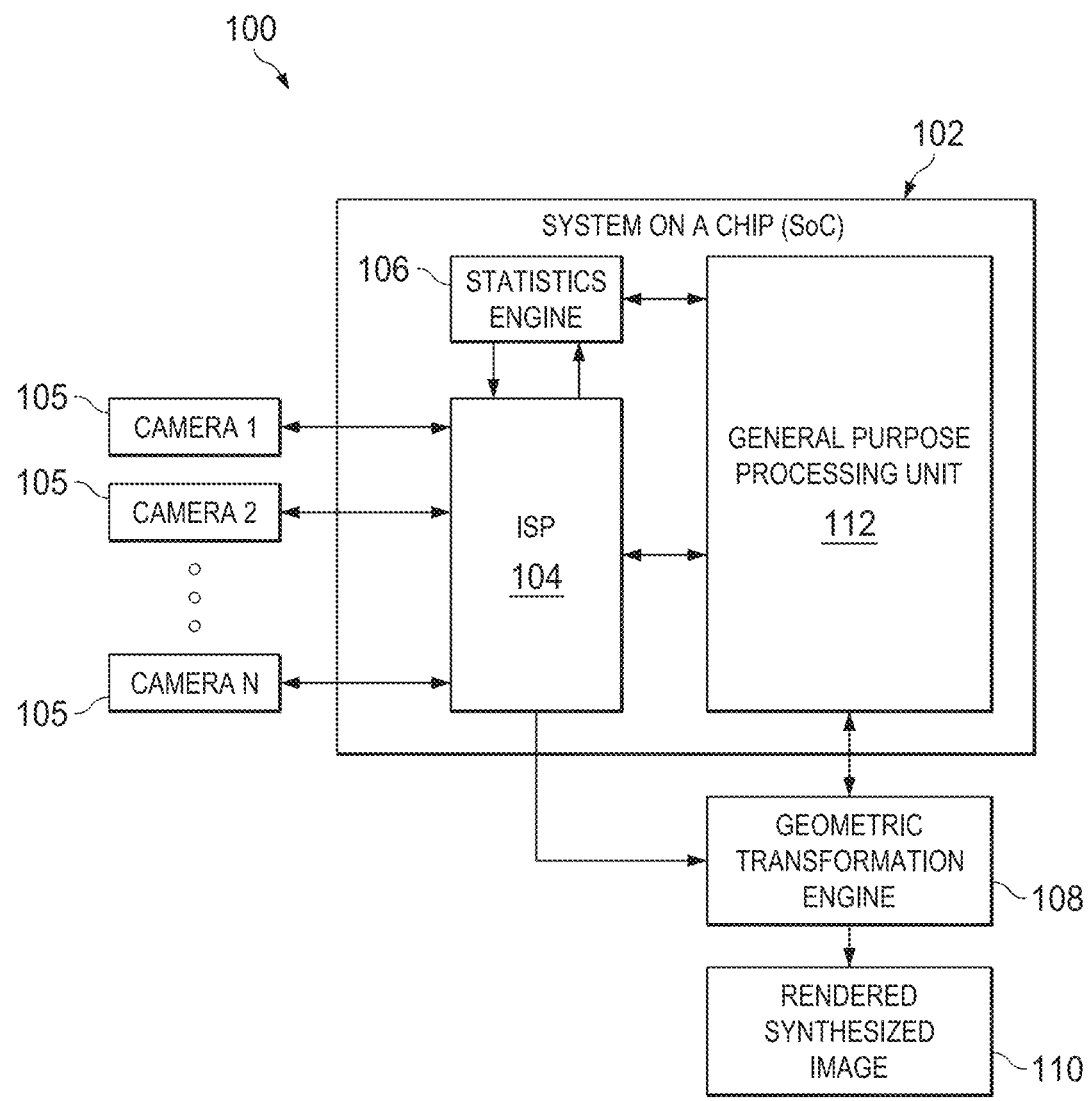
FIG. 1 is a block diagram of an example image processing system.

The systems and methods disclosed herein implement an image processing system that uses a multi-channel image signal processor (ISP) embedded within a system on a chip (SoC). The ISP receives images from multiple cameras, and generates image statistics to be processed by a unified statistics engine in order to determine the dynamic range of a setting. A setting represents the collective scene captured from multiple angles by the multiple cameras. A dynamic grouping method is implemented that dynamically arranges the cameras into groups according to the brightness and/or color temperature that the cameras are observing at a scene. The multi-channel ISP and unified statistics engine architecture, together with the dynamic grouping method provide an efficient image processing solution with high image quality. The image processing system disclosed herein is employable to implement a surround view image synthesis system, such as a vehicle surround view system that blends together images from various camera sources into a composite image.

The image processing solution disclosed herein provides high image quality while consuming fewer resources, compared to a solution that uses multiple ISPs that are external to an SoC. The image processing solution disclosed herein also consumes fewer resources compared to a solution that uses a graphical processing unit (GPU) and/or a digital signal processor (DSP) to implement a post-processing method to reduce photometric differences in the synthesized image. The solution disclosed herein uses a geometric transformation engine to perform a lens distortion correction and perspective transform without requiring post processing for removing photometric differences. In one example, the geometric transformation engine may be a GPU. Also, the use of an SoC-embedded ISP reduces the number of parts (e.g., the number of external ISP chips), thereby reducing a bill of materials and cost for implementing the solution described herein.

The multi-channel ISP described herein has multiple channels to provide the ability to concurrently process signals from more than one camera. Each input image to the image processing system is processed using the multi-channel ISP. In some examples, the multi-channel ISP is implemented within an SoC, while in other examples the multi-channel ISP is implemented external to the SoC. Use of a multi-channel ISP within an SoC allows for each of the image channels to be controlled from a global node, namely the ISP itself.

The multi-channel ISP architecture utilizes a unified statistics engine to process the statistics gathered from each of the cameras. The multi-channel ISP gathers statistics (e.g., exposure, brightness, color temperature, white balance, focus, etc.) from each camera and forwards the statistics to the unified statistics engine. The unified statistics engine analyzes the statistics in a format (e.g., a raw format) prior to image processing, and creates a global statistics buffer to determine the total dynamic range of the setting in order to classify the scene as either homogenous or heterogeneous. In particular, if the total dynamic range of the setting is at or below a threshold, the scene is classified as homogenous, and if the total dynamic range of the setting exceeds a threshold, the scene is classified as heterogeneous. Based on the classification of the scene and the processing of the statistics done by the unified statistics engine, a globally correct exposure and white balance is selected by the ISP. As such, the statistics associated with each image are available for making intelligent decisions regarding the exposure and white balance parameters of each of the cameras.

The ISP implements a dynamic grouping that groups cameras based on the determined dynamic range of the setting. For example, if the scene is considered homogenous from the brightness or color temperature perspective (as determined by a dynamic range being less than or equal to a threshold), then the cameras are grouped by setting each camera within the group to the same exposure. As used herein, the term "exposure" refers to a camera exposure level that includes an exposure time. Image sensors have both exposure time and amplification/conversion gains that affect the overall exposure. In another example, if the scene is heterogeneous (indicating dynamic range exceeds the threshold), then one or more of the cameras are removed from an existing group. The dynamic grouping balances a tradeoff between image harmonization and dynamic range.

As noted, the grouping of the cameras is dynamic. In some examples, the cameras are regrouped to accommodate the changes in light throughout the day. In an example, the dynamic range of the scene is at one point in time relatively small across each of the cameras. At this point in time, each of the cameras are assigned to the same group. Additionally, continuing with this example, as the light changes, the dynamic range reaches a threshold causing the cameras to be regrouped, such that a subset of the cameras are in a given group and another subset of the cameras are in another group. In this manner, the cameras are dynamically regrouped as the parameters of the setting (brightness and/or color temperature) observed by the cameras change.

The system provides for a quality visual experience, achieving harmonization by eliminating visible seam lines in standard dynamic range settings (e.g., when the dynamic range is low), and by preserving dynamic range in non-standard dynamic range settings (e.g., when the dynamic range is high). In particular, incorporating the statistics engine and the dynamic grouping of cameras obviates the need to use computationally intensive post processing methods. Overall, the system is cost efficient, providing a visually excellent output at lower cost/power.

The systems and methods disclosed herein apply to technological solutions in which image preprocessing occurs in one SoC, while the actual image synthesis occurs in another SoC. Thus, the system and method disclosed herein apply to image preprocessing in which dynamic grouping is used to assign an exposure gain/setting to cameras within the same group, irrespective of whether the image synthesis occurs in the same part or system or not. Additionally, the systems and methods disclosed herein apply to technological solutions in which the image preprocessing and dynamic grouping and image synthesis occur in the same SoC.

FIG. 1 is a block diagram showing an overview of an implementation of an image processing system 100. The image processing system 100 includes an image signal processor (ISP) 104 embedded within a system on a chip (SoC) 102. The ISP 104 is configured to receive a signal corresponding to an image from two or more cameras 1 . . . N, where N is an integer greater than or equal to 2. The ISP 104 is further configured to dynamically group the two or more cameras 1 . . . N into groups based on the brightness and/or color temperature observed by each of the cameras 1 . . . N, by assigning an exposure/gain setting of the two or more cameras 105 depending on the observation. A statistics engine 106 is configured to receive the image signals and statistics related to the image signals from the ISP 104, and to determine a total dynamic range of a setting corresponding to the images captured from the two or more cameras 1 ... N. The statistics engine 106 forwards the total dynamic range of the setting to the ISP 104. A geometric transformation engine 108 is configured to perform a geometric transformation of images received from the ISP 104 to render the rendered synthesized image 110 that combines the images captured by the two or more cameras 1 ... N.

In the example shown in FIG. 1, the geometric transformation engine 108 is external to the SoC 102. However in other examples, the geometric transformation engine 108 is embedded in the SoC 102. In some examples, the geometric transformation engine 108 is a graphics processing unit (GPU), while in other examples, the geometric transformation engine 108 is a dedicated hardware accelerator (HWA), a digital signal processor (DSP), or another type of general purpose processor. In examples where the geometric transformation engine 108 is implemented by a general purpose processor, in some examples the general purpose processor is the same as the general purpose processing unit 112 while in in other examples, the general purpose processor is a different module than the general purpose processing unit 112. In some examples, the GPU may be omitted. To provide the synthesized image, the geometric transformation engine 108 executes a lens distortion correction and a perspective transform. The general purpose processing unit 112 within the SoC 102 executes control code to control the ISP 104, the statistics engine 106, and in some examples the geometric transformation engine 108.

In one example, each of cameras 1 ... N includes a sensor, lens, housing, and a digitizer such that the ISP 104 receives image data from the cameras 1 ... N. The ISP 104 processes images received from each of the cameras 1 ... N. In an example, the ISP is implemented as a multi-channel ISP, such that the need for individual ISPs for each of the two or more cameras 105 is obviated. In a further example, the ISP 104 is configured to set/change an exposure/gain setting of each of the cameras 1 ... N based on the grouping of each of the cameras 105 through a backchannel control signal or other feedback signal.

Each of the cameras 105 measures a brightness and/or color temperature of a scene angle. Brightness refers to the measure of illuminance and luminous emittance that measures luminous flux per unit of area, typically measured in units of lux (symbol lx). Color temperature is a measure of the light's color and hue, and refers to the temperature of an ideal black-body radiator that radiates light of a color comparable to that of the light source. Color temperature is conventionally expressed in units of kelvin (symbol K), which is also a unit of measure for absolute temperature. In the context pertaining to the examples described herein, color temperature is also referred to as the tint observed per unit of area. Thus, for purposes of simplification of explanation, the term "color temperature" references the color of the light source at the scene.

Dynamic range refers collectively to the ratio of the highest brightness measure of a scene to the lowest brightness measure of a scene, and the ratio of the highest color temperature of a scene to the lowest color temperature of a scene. Dynamic range is expressed in decibels (dB). Dynamic range is typically expressed as a ratio in log domain with a scaling factors. In some examples, the scaling factor is about 20. Thus, in one example the dynamic range is represented by Equation 1:

$$20\log\left(\frac{\text{highest luminance}}{\text{lowest luminance}}\right) = \text{dynamic range} \quad \text{Equation 1}$$

To the extent that use of the term "dynamic range" conflicts with standard usage in image processing, in the examples described herein dynamic range can also be referred to a difference in intensity, or an intensity delta. In some examples, to arrive at a total dynamic range that incorporates brightness and/or color temperature, a weighted average of brightness and/or color temperature and a metric that accounts for the range observed in a scene across the three-dimensional Planckian locus are employed.

The dynamic grouping process is executed such that each camera of cameras 105 in the same group is assigned the same exposure/gain setting by the ISP 104. Accordingly, the ISP 104 is programmed to set the cameras 105 that are observing partitions of a scene with similar brightness and/or similar color temperature to the same exposure/gain setting. Having similar brightness and/or color temperature refers to a measured brightness or color temperature within a threshold. As an example, if camera 1 is observing 10 lux of light, and camera 2 is observing 11 lux of light, then because the measured brightness is sufficiently similar, then camera 1 and camera 2, via ISP 104, are assigned to a common group and set to have the same exposure/gain setting. By setting the cameras 105 to the same exposure/gain setting in this example, a seam line is avoided when the images from camera 1 and camera 2 are blended together to form the rendered synthesized image 110. In another example, if the exposure difference between camera 1 and camera 2 exceeds a threshold (e.g., there is a large brightness difference observed by the cameras 1 and 2), the ISP 104 assigns the camera 1 to a first group and the camera 2 to a second group with different exposures. For example, in a case where there is a scene where a given camera 105 is observing a dark region of the scene while another camera 105 is observing a bright region, then setting the cameras to the same exposure/gain setting would unduly limit the scenery details captured by one of the given and the other camera 105. That is, one image would either be too dark, or too overexposed. Thus, by assigning the cameras 105 to different groups with different exposures, the SoC diligently balances the need for image harmonization (such that the synthesized image has seam lines) against the need for preserving the dynamic range of the scene for the rendered synthesized image 110.

The threshold parameter used to assign the cameras into different groups is configurable, and thus programmable. The cameras 105 are dynamically regrouped as the setting observed by the cameras 105 changes. In some examples, the cameras 105 are regrouped consistent with the changes in light throughout the day.

The ISP 104 implements an auto-exposure function to assign the exposure/gain setting of each camera as the grouping of the cameras is being performed. In an example, the auto-exposure function is implemented as a functional software module within the ISP 104. The dynamic grouping process is implemented by the ISP 104 in several ways. In one example, the dynamic grouping process groups the cameras based on heuristic that groups cameras with similar view brightness and/or color temperature into the same group. In another example, the dynamic grouping process groups the cameras based on an exhaustive search. In some examples, the exhaustive search grouping calculates a cost for the allowable ways the cameras are grouped, and grouping the cameras in order to curtail the cost. In this context, cost defines the extent to which image harmonization and dynamic range are balanced, such that image harmonization is achieved and dynamic range preserved.

Thus, by employing the image processing system 100, the rendered synthesized image 110 achieves high image quality by providing a careful balance of the tradeoff between image harmonization and preserving dynamic range to allow the details of a scene to be visible in the rendered synthesized image 110. The ISP 104 reduces cost by eliminating the need for multiple external ISP chips. Additionally, by the dynamic grouping of the N number of cameras 105 typically uses less processing cycles (e.g., the ISP uses 20% of general purpose processing unit 112 rather than a significantly higher percentage for a geometric transformation engine 108 or GPU/DSP utilized solution) at a lower frequency (e.g., 200 Mhz), as compared to multiple Ghz (utilizing more power) typically used to implement a complex post-processing method by a GPU or DSP, or the geometric transformation engine 108 needed to reduce photometric differences in the rendered synthesized image 110. Thus, the dynamic grouping of the N number of cameras 105 implemented by the ISP 104 saves power as well as area because complex post-processing is not performed by the geometric transformation engine 108 or by a separate DSP. Stated differently, lower cost and lower thermal dissipation is achieved by avoiding the need for employing the geometric transformation engine 108, GPU or a separate DSP in complex post-processing.

Figure 2:
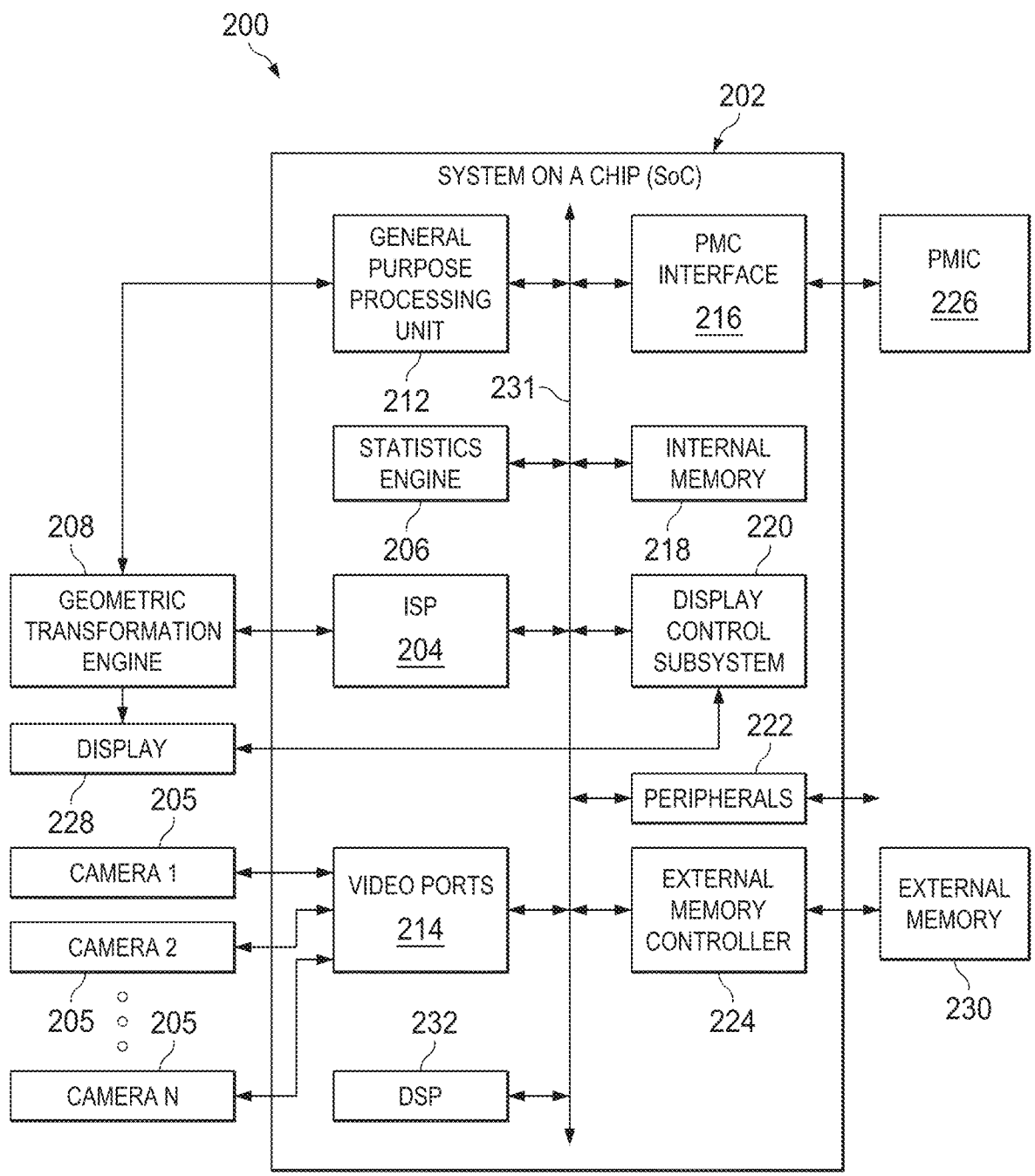
FIG. 2 is a block diagram of example hardware components used to implement an example image processing system.

FIG. 2 is a block diagram of example hardware components used to implement an image processing system 200, including for the image processing system depicted in FIG. 1. An SoC 202 includes a general purpose processing unit 212, a power management circuit (PMC) interface 216, a statistics engine 206, an image signal processor (ISP) 204, video ports 214, an internal memory 218, a display controller subsystem 220, peripherals 222, an external memory controller 224, and a digital signal processor (DSP) 232. In this example, these parts are bidirectionally connected to a system bus 231. The geometric transformation engine 208 is configured to perform a geometric transformation of images received from the ISP 204 to render a synthesized image onto the display 228 that combines the images captured by the two or more cameras 1 . . . N. In the example shown in FIG. 2, the geometric transformation engine 208 is external to the SoC 202. In other examples, the geometric transformation engine 208 is embedded within the SoC 202.

The general purpose processing unit 212 executes control code. The control code, when executed by the SoC 202, facilitates interaction with a user. Thus, general purpose processing unit 212 controls how the SoC 202 responds to user inputs (typically received via peripherals 222). The statistics engine 206 processes brightness and/or color temperature statistics received from the ISP 204 to determine the total dynamic range of a setting observed by each of the cameras 1 . . . N. The ISP 204 processes images and data received from the cameras 205, including data related to the brightness and/or color temperature of each of the images. The ISP 204 also performs a dynamic grouping to set the exposures of the cameras (via video ports 214), depending on the similarity of the brightness and/or color temperature observed by each of the cameras. The dynamic grouping implemented by the ISP 204 provides a calculated tradeoff between image harmonization and dynamic range for the synthesized rendered image. In certain examples, the geometric transformation engine 208 is configured to perform a lens distortion correction and a perspective transform. A perspective transform creates a perspective by transforming an image to look as if the image was captured from a certain virtual viewpoint. In some examples, the geometric transformation engine 208 is implemented within the ISP 204.

The geometric transformation engine 208 performs image synthesis and display oriented operations used for manipulation of the data to be displayed on the display 228. In some examples, the geometric transformation engine 208 rather than the ISP 204 is configured to perform a lens distortion correction and a perspective transform. In some examples, the geometric transformation engine 208 is a graphics processing unit (GPU), while in other examples, the geometric transformation engine 108 is a dedicated hardware accelerator (HWA), a digital signal processor (DSP), or another type of general purpose processor. In examples where the geometric transformation engine 208 is implemented by a DSP, in some examples the DSP is the same as the DSP 232 while in in other examples, the DSP is a different module than the DSP 232. In examples where the geometric transformation engine 208 is implemented by a general purpose processor, in some examples the general purpose processor is the same as the general purpose processing unit 212 while in in other examples, the general purpose processor is a different module than the general purpose processing unit 212. A GPU is not a mandatory requirement for implementation of an image processing system or any type of multi-camera system or blending multiple images.

The video ports 214 receive the input images from the cameras 1 . . . N. The video ports 214 typically also include suitable buffering of the image data prior to processing, and facilitate the ISP 204 setting the exposures of the cameras 205 in a feedback loop. The internal memory 218 stores data used by other units and is employable to pass data between units. The display controller subsystem 220 generates the signals to drive the display 228 used by the image processing system 200. In at least one example, the general purpose processing unit 212, the ISP 204, the statistics engine 206, the geometric transformation engine 208, and/or the display controller subsystem 220 includes an instruction and data cache. In at least one example, the instruction and data cache for the general purpose processing unit 212, the ISP 204, the statistics engine 206, the geometric transformation engine 208, and/or the display controller subsystem 220 are implemented within each of the general purpose processing unit 212, the ISP 204, the statistics engine 206, the geometric transformation engine 208, and/or the display controller subsystem 220, respectively. In at least one other example, the instruction and data cache for the general purpose processing unit 212, the ISP 204, the statistics engine 206, the geometric transformation engine 208, and/or the display controller subsystem 220 are implemented within internal memory 218, another processing unit within the SoC 202, or by a processing unit external to the SoC 202. In some examples, the peripherals 222 are various parts such as a direct memory access controller, power control logic, programmable timers and external communication ports for exchange of data with external systems. The PMC interface 216 interfaces with the power management integrated circuit (PMIC) 226 to manage power requirements for the SoC 202. The external memory controller 224 controls data movement into and out of the external memory 230. In certain examples, the digital signal processor (DSP) 232 performs a blending/stitching operation to render a synthesized image onto the display 228.

Figure 3:
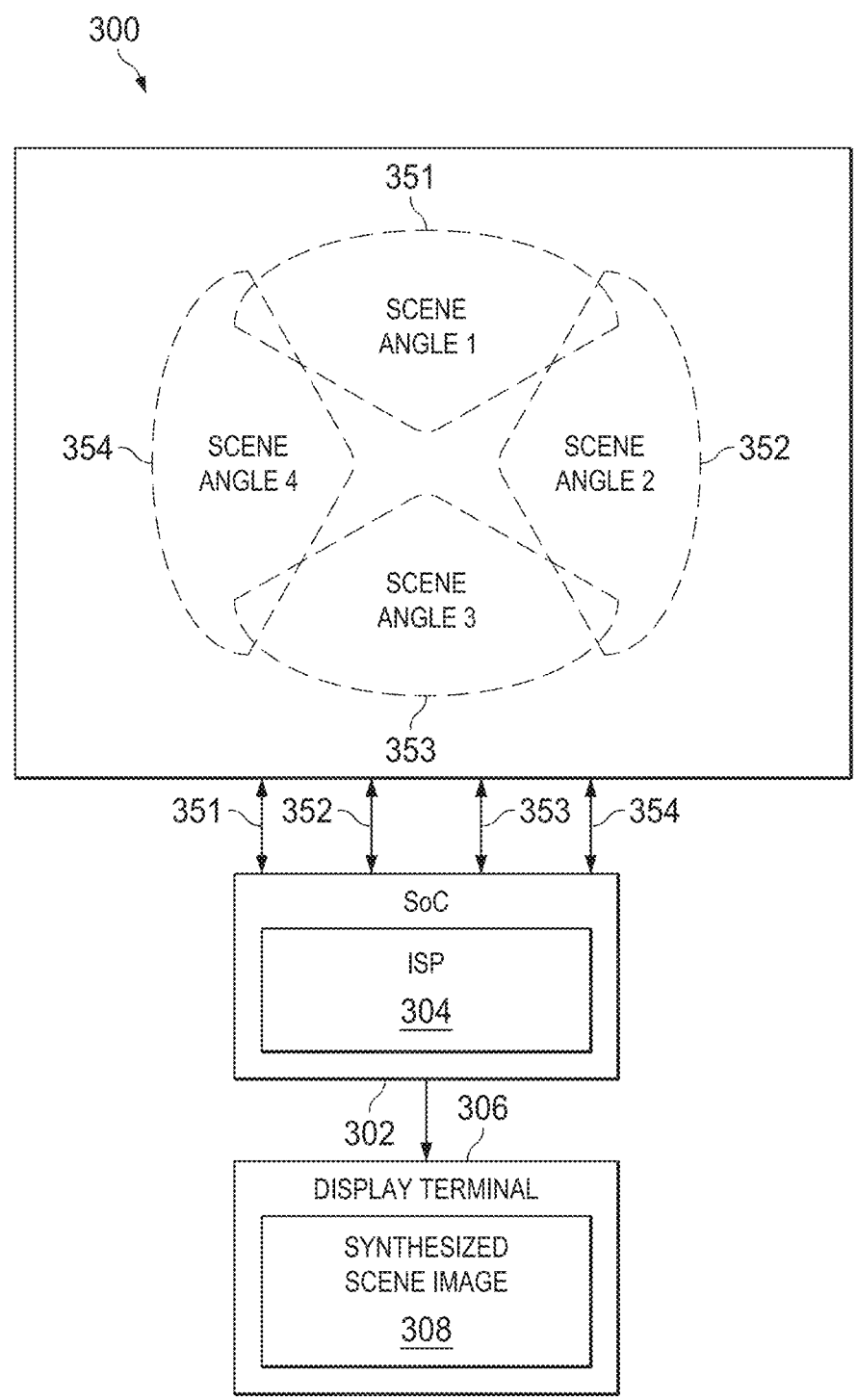
FIG. 3 is an illustration of an example image processing camera system.

FIG. 3 is an illustration of an example image processing system 300 as described by FIG. 1 and FIG. 2. In this example, four cameras capture four different scene angles, namely scene angle 1 351, scene angle 2 352, scene angle 3

353, and scene angle 4 354. In this example, adjacent scene angles overlap, such that scene angle 1 351 overlaps with the scene angle 2 352 and the scene angle 4 354; the scene angle 2 352 overlaps with the scene angle 1 351 and the scene angle 3 353; the scene angle 3 353 overlaps with the scene angle 2 352 and the scene angle 4 354; and the scene angle 4 354 overlaps with the scene angle 3 353 and the scene angle 1 351. The scene angles (in FIG. 3, scene angle 1 351, scene angle 2 352, scene angle 3 353, and scene angle 4 354) captured by the four cameras are input into the system on a chip (SoC) 302. The images are processed by an ISP 304, which implements a dynamic grouping of the cameras to set the exposures of each of the four cameras in a feedback loop. The dynamic grouping of the cameras implemented by the ISP 304 groups the cameras to balance a tradeoff between image harmonization and preservation of the dynamic range of the synthesized scene image 308. The SoC 302 outputs the synthesized scene image 308 onto the display terminal 306. The display terminal 306 is accessed by a user of the image processing system 300. Many different use cases are supported by the image processing system 300, including for automotive (e.g., parking assistance systems) and security systems.

Figure 4:
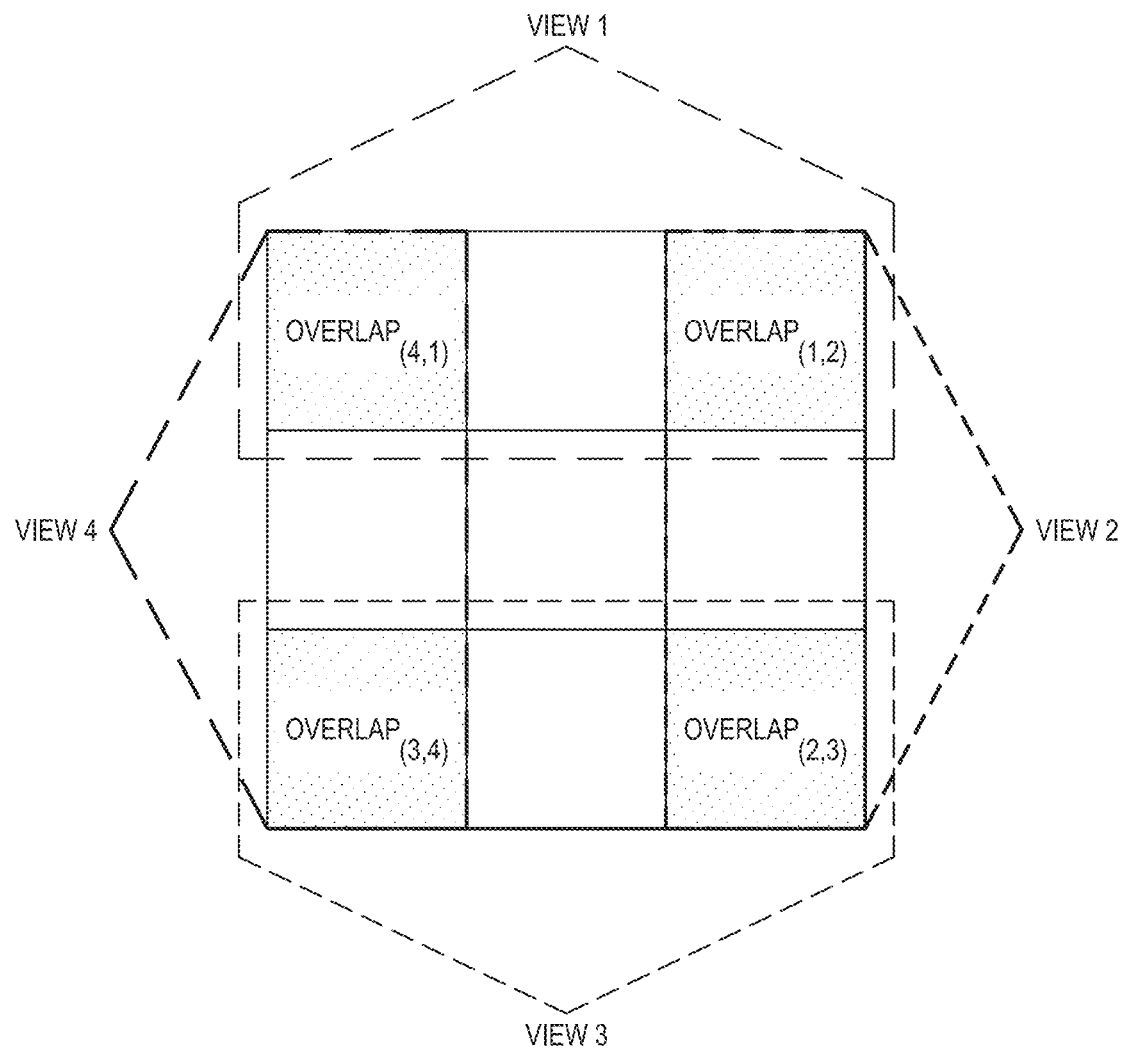
FIG. 4 is example of overlapping regions between adjacent views in a four camera image processing camera system.

FIG. 4 is another example of overlapping regions between adjacent views in an image processing system, such as the image processing system 100 depicted in FIG. 1, the image processing system 200 depicted in FIG. 2, and/or the image processing system 300 depicted in FIG. 3. As shown in FIG. 4, a composite image synthesis includes data from the four input frames, view 1, view 2, view 3, and view 4. The overlapping regions are the portion of the frames that corresponds to the same physical angle and captured by two adjacent cameras. The four views depicted in FIG. 4, for example, correspond to angles captured by cameras installed on a car, or within a building for a security application or for another image processing system application.

Figure 5:
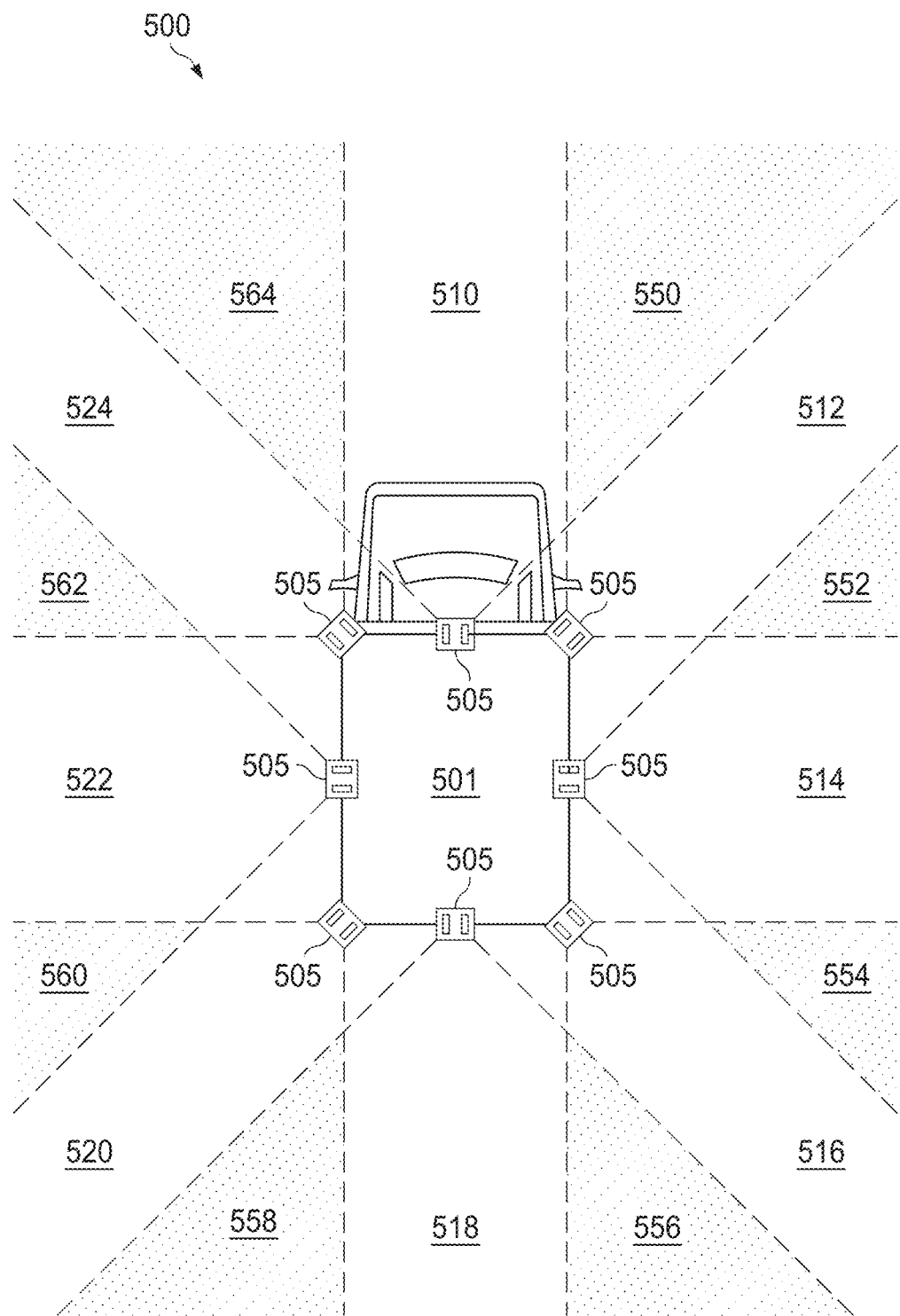
FIG. 5 illustrates an example diagram of a vehicle implementing an image processing system.

FIG. 5 illustrates an example diagram 500 of a vehicle 501 implementing an image synthesis system utilizing the image processing system 100 of FIG. 1, the image processing system 200 of FIG. 2, or the image processing system 300 of FIG. 3. The vehicle 501 is demonstrated in the example of FIG. 5 in an overhead view. The vehicle 501 thus includes eight cameras 505 affixed thereto, arranged at each orthogonal edge and each corner of the vehicle 501. Thus, the cameras 505 thus each have respective perspective orientations that provide a first field of view 510, a second field of view 512, a third a field of view 514, a fourth field of view 516, a fifth field of view 518, a sixth field of view 520, a seventh field of view 522, and an eighth field of view 524. In the illustrated example, the cameras 505 are each demonstrated as having approximately 90° fields of view. However, in other examples the fields of view have other angles and orientations. Each of the cameras 505 provides real-time image data that are be combined (e.g., via a system on a chip (SoC) such as the SoC 102 of FIG. 1, the SoC 202 of FIG. 2, and/or the SoC 302 of FIG. 3) as a synthesized image that is displayed on a display terminal such as the display terminal 306. As a result, the user views the synthesized image at a location and at an orientation that is based on a location perspective corresponding to a viewing perspective of the user from a given virtual location relative to a rendered three-dimensional representation of the vehicle 501.

In addition, the diagram 500 demonstrates overlaps between the fields of view provided by the cameras 505. In the example of FIG. 5, the diagram 500 includes a first overlap 550 associated with the first and second fields of view 510 and 512, a second overlap 552 associated with the second and third fields of view 512 and 514, a third overlap 554 associated with the third and fourth fields of view 514 and 516, and a fourth overlap 556 associated with the fourth and fifth fields of view 516 and 518. The diagram 500 also includes a fifth overlap 558 associated with the fifth and sixth fields of view 518 and 520, a sixth overlap 560 associated with the sixth and seventh fields of view 520 and 522, a seventh overlap 562 associated with the seventh and eighth fields of view 522 and 524, and an eighth overlap 564 associated with the eighth and first fields of view 524 and 510. In some examples, an image signal processor (ISP) (such as the ISP 104 of FIG. 1, the ISP 204 of FIG. 2, and the ISP 304 of FIG. 3) is configured to identify the overlaps (the first overlap 550, the second overlap 552, the third overlap 554, the fourth overlap 556, the fifth overlap 558, the sixth overlap 560, the seventh overlap 562, and the eighth overlap 564) based on image signals provided via the cameras 505. In some examples, an SoC (such as such as the SoC 102 of FIG. 1, the SoC 202 of FIG. 2, or the SoC 302 of FIG. 3) is configured to generate a synthesized image as a single contiguous scene of interest by aligning an image characterized by the image data by each of the cameras 505 at the respective overlaps (the first overlap 550, the second overlap 552, the third overlap 554, the fourth overlap 556, the fifth overlap 558, the sixth overlap 560, the seventh overlap 562, and the eighth overlap 564). Therefore, in some examples, the synthesized rendered image data includes a rendered three-dimensional representation of the vehicle 501 and the real-time video images of each of the scenes of interest captured by each of the cameras 505 as contiguously superimposed relative to the fields of view 510, 512, 514, 516, 518, 520, 522, and 524 of each of the cameras 505. Accordingly, the synthesized image is for example superimposed as substantially surrounding a rendered representation of the vehicle 501 to display the video images of the corresponding scene of interest surrounding the vehicle 501 to a user via a user interface 24 (e.g., the display 228 or the display terminal 306).

Figure 6:
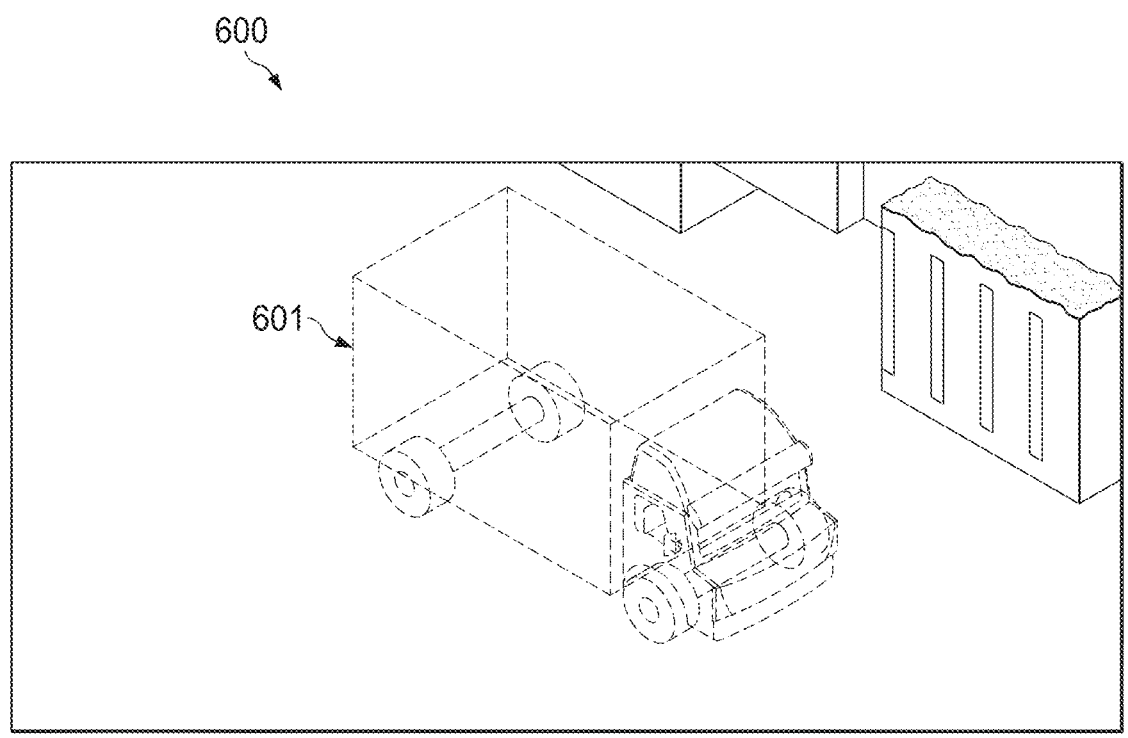
FIG. 6 illustrates an example synthesized image depicting the scene observed by the vehicle of FIG. 5.

FIG. 6 illustrates a first example of a rendered synthesized image 600. The rendered synthesized image 600 is demonstrated as including a rendered three-dimensional virtual representation of a vehicle 601 (which in this example is a 3D representation of the vehicle 501 in the example of FIG. 5). In this example, the rendered synthesized image 600 has been stitched together by an image synthesis system utilizing the image processing system 100 of FIG. 1, the image processing system 200 of FIG. 2, or the image processing system 300 of FIG. 3. In this example, a user is for example able to ascertain the three-dimensional features of the scene of interest. The rendered synthesized image 600 demonstrates composite image data that is for example represented as a single contiguous scene of interest surrounding the rendered three-dimensional virtual representation of the vehicle 601. The composite image data is for example generated based on an image signal processor such as the image processor (ISP) 104 of FIG. 1, the ISP 204 of FIG. 2, or the ISP 304 of FIG. 3 aligning the real-time video data and depth data generated by each of the cameras 505 of FIG. 5 at the respective overlaps (the first overlap 550, the second overlap 552, the third overlap 554, the fourth overlap 556, the fifth overlap 558, the sixth overlap 560, the seventh overlap 562, and the eighth overlap 564) between the respective fields of view 510, 512, 514, 516, 518, 520, 522, and 524. Therefore, the rendered synthesized image 600 includes, for example, the rendered three-dimensional virtual representation of the vehicle 601 (or the vehicle 501 of FIG. 5) and the real-time video images of each of the scenes of interest captured by each of the cameras 505 as contiguously superimposed relative to the respective fields of view (first field of view 510, second field of view 512, third field of view 514, fourth field of view 516, fifth field of view 518, sixth field of view 520, seventh field of view 522, and eight field of view 524) of each of the cameras 505 of FIG. 5.

In the example of FIG. 6, the rendered synthesized image 600 is demonstrated as being displayed to a user from a given location perspective that is offset from the rendered three-dimensional virtual representation of the vehicle 601 (or the vehicle 501 of FIG. 5) by a predetermined distance, and is based on an orientation angle (e.g., azimuth and polar angles in a spherical coordinate system) that corresponds to a view looking diagonally down from between the front and right side of the rendered three-dimensional virtual representation of the vehicle 601. The location perspective is for example based on the user implementing a platform-centric view of the composite image data, in which the location perspective of the user is offset from and substantially centered upon the rendered three-dimensional virtual representation of the vehicle 601. In the platform-centric view, as an example, the user provides inputs via a user interface, such as one implemented within the display terminal 306 of FIG. 3, to move, zoom, and/or change viewing orientation via graphical or hardware controls to change the location perspective. Therefore, the user views the real-time video images of the scene of interest from substantially any angle and/or any distance with respect to the rendered three-dimensional virtual representation of the vehicle 601. Additionally, the user for example implements the user interface to switch to a different view, such as a camera-perspective view associated with the location perspective of the user being substantially similar to the perspective orientation of a respective one of the cameras 505. Thus, the synthesized image is displayed to provide spatial awareness within the environment that, in an example, corresponds to the geographic region in which the vehicle 601 is located.

Figure 7:
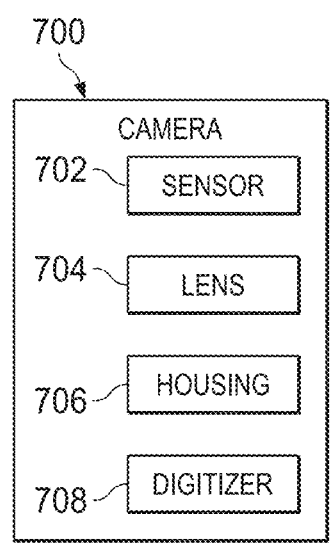
FIG. 7 is a block diagram of an example camera used in an image processing system implemented as disclosed herein.

FIG. 7 is an example camera 700 employable for use by an image processing system, such as the image processing system 100 of FIG. 1, the image processing system 200 of FIG. 2, or the image processing system 300 of FIG. 3. Thus, the camera 700 is a block diagram of the cameras 105 depicted in FIG. 1, the cameras 205 depicted in FIG. 2, and the cameras 505 depicted in FIG. 5. The camera 700 includes a sensor 702, a lens 704, a housing 706, and a digitizer 708.

In some examples, the sensor 702 is a charged coupled device (CCD) or a complementary metal-oxide-semiconductor (CMOS). The lens 704 bends, refracts, and focuses light onto the sensor 702. The lens 704 is used in conjunction with the sensor 702, the housing 706, and the digitizer 708 to develop images of objects and of a scene either on photographic film or on another media capable of storing an image chemically or electronically. In some examples, CCD and CMOS sensors convert an optical signal to an electric signal without use of the digitizer 708. Accordingly, in some examples, the camera 700 does not include the digitizer 708. CCD sensors output an analog voltage signal and thus, in some examples, include the digitizer 708 for analog to digital (A-to-D) conversion. CMOS sensors output digital signals directly. In some examples, and in particular the camera 700 depicted in FIG. 7, the camera 700 does not include an image signal processor (ISP), as the image processing system embeds an ISP (e.g., the ISP 104 of FIG. 1, the ISP 204 of FIG. 2, or the ISP 304 of FIG. 3) within a system on a chip (SoC). Thus, the SoC (e.g., the SoC 102 of FIG. 1, the SoC 202 of FIG. 2, or the SoC 302 of FIG. 3) embeds one ISP rather than having a different ISP for each of the different cameras (e.g., the cameras 105 of FIG. 1, the cameras 205 of FIG. 2, or the cameras 505 of FIG. 5).

Figure 8:
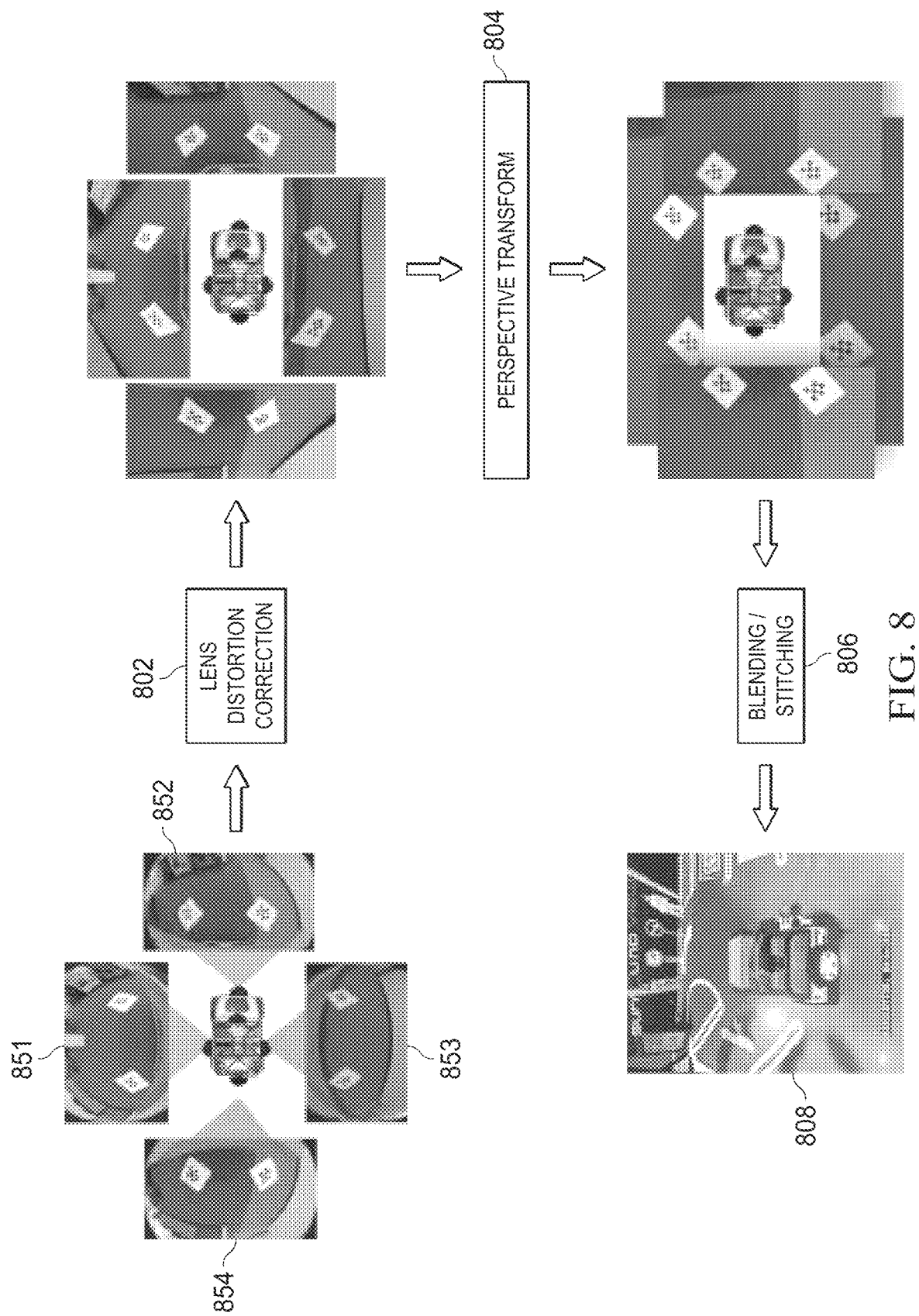
FIG. 8 depicts an overview of example operations performed by an image processing system.

FIG. 8 depicts an overview of example operations performed by an image processing system such as the image processing system 100 of FIG. 1, the image processing system 200 of FIG. 2, and/or the image processing system 300 of FIG. 3. In this example, four images (the image 851, the image 852, the image 853, and the image 854) are captured by four different cameras. After the four images are captured by the cameras, a lens distortion correction 802 is performed, followed by a perspective transform 804, followed by a blending/stitching operation 806 to create a rendered synthesized scene image 808. The perspective transform 804 creates a perspective by transforming the image to look as if the image was captured from a certain virtual viewpoint. In one implementation example, the lens distortion correction 802 and perspective transform 804 is executed by an image signal processor (ISP), such as the ISP 104 of FIG. 1, the ISP 204 of FIG. 2, or the ISP 304 of FIG. 3; while the blending/stitching operation 806 to create the rendered synthesized scene image 808 is executed by a digital signal processor (DSP) (such as the DSP 232 of FIG. 2). In another implementation example, the lens distortion correction 802 and perspective transform 804 is executed by a geometric transformation engine, such as the geometric transformation engine 108 of FIG. 1, or the geometric transformation engine 208 of FIG. 2 (in some examples, the geometric transformation engine 108 is a graphics processing unit (GPU) and the geometric transformation engine 208 is a graphics processing unit (GPU)); while the blending/ stitching operation 806 to create the rendered synthesized scene image 808 is executed by the DSP (such as the DSP 232 of FIG. 2). In some examples, the synthesized image represents the rendered synthesized image 110 of FIG. 1, the synthesized scene image 308 of FIG. 3, and/or the rendered synthesized image 600 of FIG. 6.

Figure 9:
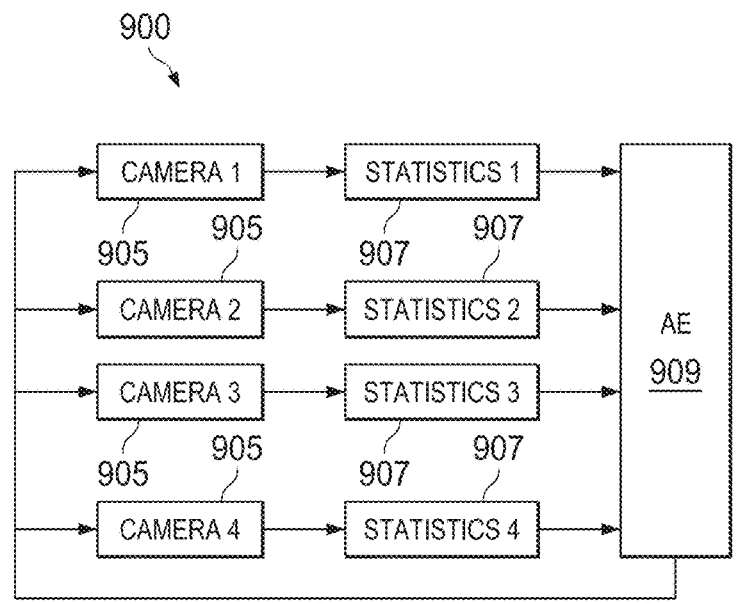
FIG. 9 is an example state of an image processing system with the four cameras grouped in one group with the same exposure/gain setting.

FIG. 9 is an image processing system state 900 of an image processing system (e.g., the image processing system 100 of FIG. 1, the image processing system 200 of FIG. 2, and/or the image processing system 300 of FIG. 3) with four cameras 905 grouped in one group with the same exposure. Each of the cameras 1-4 generates respective statistics 907. The statistics 907 include hardware assisted statistics such as auto-exposure, auto white balance and auto-focus. The statistics 907 from the cameras 905 are provided to an auto-exposure engine 909 which determines how to group the cameras and groups them in a continuous feedback loop. The auto-exposure engine 909, in an example, is a functional software module within an image signal processor (ISP) embedded within a system on a chip (SoC) (e.g., the ISP 104 within SoC 102 of FIG. 1, the ISP 204 within SoC 202 of FIG. 2, and/or the ISP 304 within SoC 302 of FIG. 3). In this particular image processing system state 900, the four cameras 905 are set to have the same exposure by the auto-exposure engine 909 to avoid visible seam lines in a (blended) resultant rendered synthesized image. The image processing system state 900 is typically the state when the entire setting has low dynamic range as measured by the cameras 1-4. Because the cameras 1-4 have been assigned to have the same exposure, image harmonization is achieved by reducing dynamic range.

Figure 10:
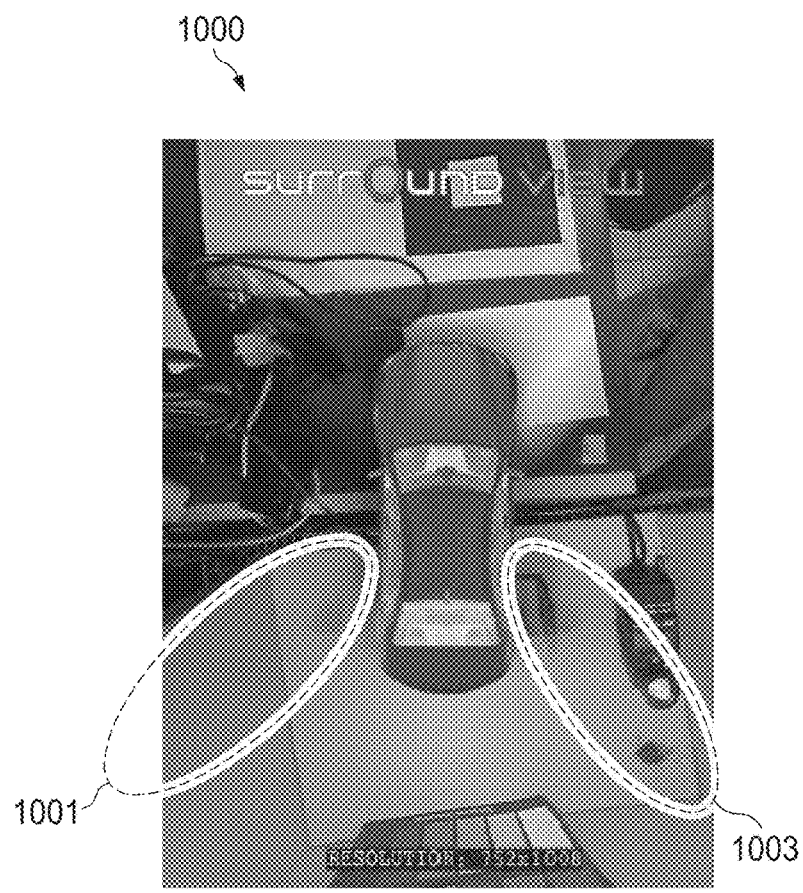
FIG. 10 illustrates an example image output of an image processing system observing a low dynamic range setting where each camera is assigned to have the same exposure/gain setting.

FIG. 10 illustrates a synthesized image output 1000 of an image processing system after the cameras are grouped to have to the same exposure/gain setting as when the image processing system is in example image processing system state 900 in FIG. 9. Grouping the cameras to have the same exposure/gain setting is usually done when the setting has a low dynamic range overall. If the cameras were not grouped to have the same exposure/gain setting, visible seam lines (showing where the boundary of one camera ends and where the boundary of another camera starts) that detract from image quality would likely be present in the synthesized image output, and specifically in the image region 1001 and the image region 1003, because the exposure/gain setting between at least two camera would be different. In contrast, in FIG. 10, visible seam lines are not present within the image region 1001 and the image region 1003 because the cameras have been assigned the same exposure/gain setting as illustrated by the image processing system state 900 shown in FIG. 9. Thus, in FIG. 10, image harmonization is achieved such that seam lines are eliminated. Image harmonization is achieved in many such instances without compromising the dynamic range even when the cameras have been assigned the same exposure/gain setting.

Figure 11:
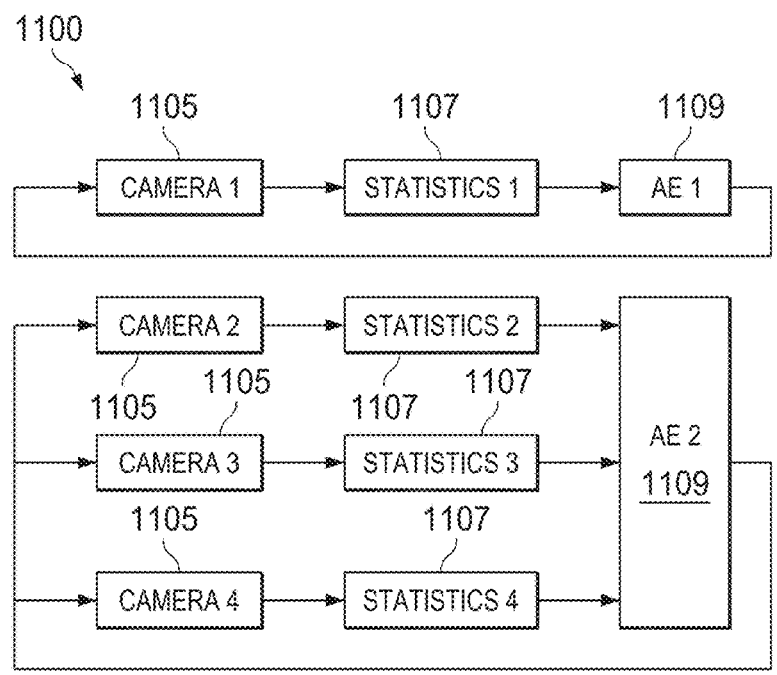
FIG. 11 is an example state of an image processing system with one camera decoupled and assigned its own exposure/gain setting different from the other cameras.

FIG. 11 is an example image processing system state 1100 of an image processing system (e.g., the image processing system 100 of FIG. 1, the image processing system 200 of FIG. 2, and/or the image processing system 300 of FIG. 3) with one camera decoupled. In this example, like the example image processing system state 900 depicted in FIG. 9, each of the cameras 1-4 generates respective statistics 1107. The statistics 1107 include hardware assisted statistics such as auto-exposure, auto white balance and auto-focus. The statistics 1107 from the cameras 1105 are provided to an auto-exposure engine 1109 which determines how to group the cameras and groups them in a continuous feedback loop. In this particular image processing system state 1100, camera 1 is set to a first exposure/gain setting by a first of different instances of an auto-exposure engine 1109, namely auto-exposure engine 1, while cameras 2-4 are set to have a second exposure/gain setting by the second of different instances of the auto-exposure engine 1109, namely, auto-exposure engine 2, where the second exposure/gain setting is different from the first exposure/gain setting. In some examples, each auto-exposure engine 1109 (e.g., auto-exposure engine 1 and auto-exposure engine 2) is an instance of a software module being executed by an image signal processor (ISP) embedded within a system on a chip (SoC) (e.g., the ISP 104 within the SoC 102 of FIG. 1, the ISP 204 within the SoC 202 of FIG. 2, and/or the ISP 304 within the SoC 302 of FIG. 3). The surround sound view system is typically in the image processing system state 1100 in situations when the entire setting has a high dynamic range as measured by cameras 1-4. As the camera 1 is assigned to a different group with a different exposure/gain setting than the cameras 2-4, a reasonable dynamic range for a resultant synthesized image (e.g., the rendered synthesized image 110 of FIG. 1, the rendered synthesized scene image 308 of FIG. 3, and/or the rendered synthesized image 600 of FIG. 6) is achieved while balancing image harmonization.

Figure 12:
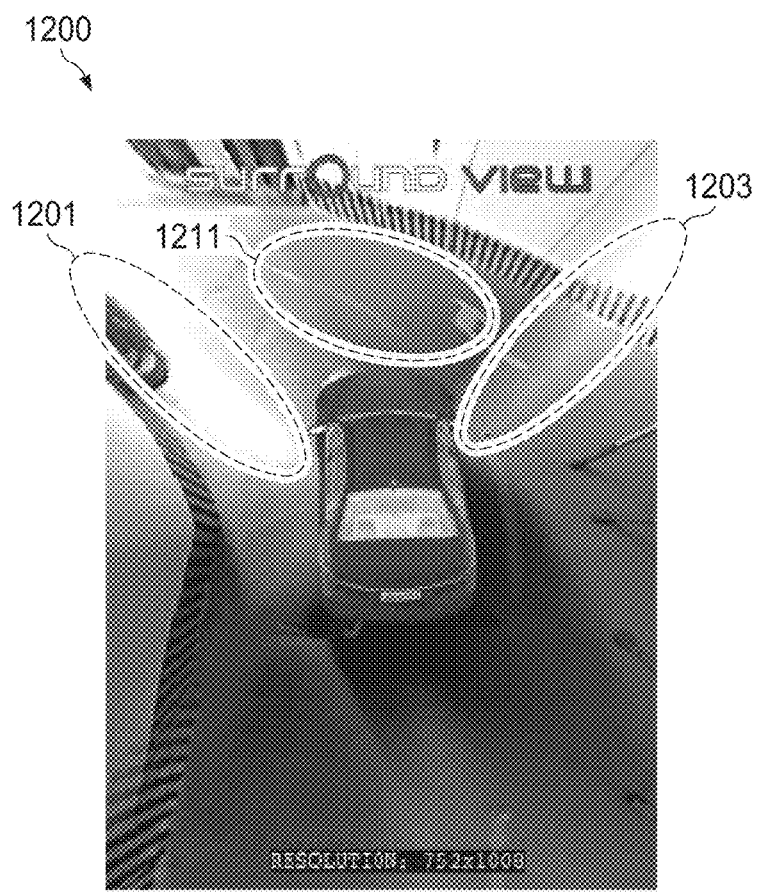
FIG. 12 illustrates an example image output of an image processing system observing a high dynamic range setting, where a camera is decoupled.

FIG. 12 depicts an example synthesized image output 1200 of an image processing system with four cameras observing a high dynamic range setting, where one camera is set to have a different exposure/gain setting from the other cameras of the image processing system. FIG. 12 depicts an example image that results from example image processing system state 1100 of FIG. 11. In the example synthesized image output 1200 shown in FIG. 12, three of the cameras are observing a relatively dark part of the scene, while the camera at the front part of the car is observing a relatively bright part of the scene. The camera situated at the front of the car is observing the image region 1211. In FIG. 12, the front camera has been assigned to a different group than the other three cameras in the scene in order to achieve a reasonable dynamic range in the synthesized image output 1200, in accordance with the image processing system state 1100 shown in FIG. 11. In particular, the front camera observing the image region 1211 is assigned to a first group and set to have a first exposure/gain setting, while the other three cameras are assigned to a second group and set to have a second exposure/gain setting which is different from the first exposure/gain setting. By assigning the front camera to a different group than the remaining three cameras, the road markings in the image region 1211 are seen more clearly while balancing the presence of seam lines in the image region 1201 (encircled) and in the image region 1203 (encircled). If the front camera was assigned to the same group as the remaining cameras (the second group), the synthesized image output 1200 would show no seam lines in image region 1201 and image region 1203, however the front camera would be overexposed and image region 1211 would be too bright with no detail of the road. FIG. 12 therefore represents a scenario where dynamic range should be favored with respect to image harmonization.

Figure 13:
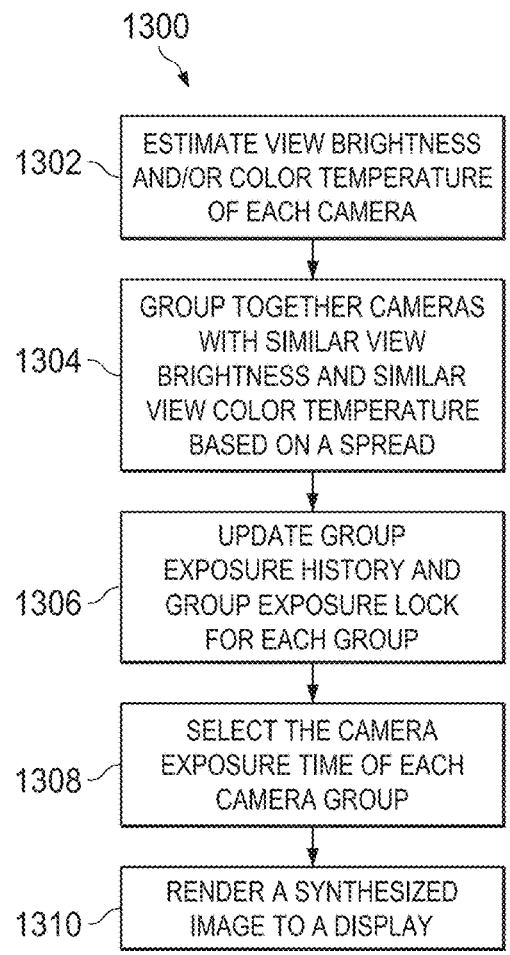
FIG. 13 is an example method to implement an image processing system by dynamically grouping cameras using a heuristic.

FIG. 13 is an example method to implement an image processing system (e.g., the image processing system 100 of FIG. 1, the image processing system 200 of FIG. 2, and/or the image processing system 300 of FIG. 3) by dynamically grouping cameras using a heuristic. The method 1300 is performed by, for example, an image processing system such as the image processing system 100 of FIG. 1, the image processing system 200 of FIG. 2, and/or the image processing system 300 of FIG. 3. At 1302, the view brightness and/or/or color temperature of each camera is estimated by a statistics engine (e.g., the statistics engine 106 of FIG. 1 and/or the statistics engine 206 of FIG. 2) for forwarding to an image signal processor (ISP), such as the image signal processor (ISP) 104 of FIG. 1, the ISP 204 of FIG. 2, and/or the ISP 304 of FIG. 3. In some examples, just the view brightness of each camera is estimated, or just the color temperature of each camera is estimated. In some examples, estimating the view brightness and/or color temperature of each camera involves estimating an average view brightness and/or color temperature over a specific time period of each camera.

At 1304, a camera grouping is performed by grouping together cameras with a variance in view brightness and/or view color temperature that is below a threshold. More specifically, cameras with similar view brightness and/or similar view color temperature are grouped together depending on a spread, where the spread is calculated by determining the least measured view brightness and/or color temperature of the two or more cameras and the greatest measured view brightness and/or color temperature of the two or more cameras. The cameras are assigned to different groups when the spread of the camera view brightness and/or color temperature is above a threshold by a group assigning method. The group assigning method includes determining a greatest measured brightness and/or color temperature jump between consecutive cameras having a first measured brightness and/or color temperature and a second measured brightness and/or color temperature within a sorted measured brightness and/or color temperature for the cameras, wherein the first measured brightness and/or color temperature is less than the second measured brightness and/or color temperature. The cameras with a measured view brightness and/or color temperature equal to or lower than the first measured view brightness and/or color temperature are assigned to a first group, and the cameras with a measured view brightness and/or color temperature equal to or greater than the second measured view brightness and/or color temperature are assigned to a second group. As used herein the term "jump" corresponds to the difference between the measured view brightness and/or/or color temperature of consecutive cameras (when the cameras have been sorted in order from the darkest measured view brightness and/or color temperature to the brightest view measured brightness and/or color temperature). The grouping method is for example performed by an (ISP), such as ISP 104 of FIG. 1, the ISP 204 of FIG. 2, and/or the ISP 304 of FIG. 3. The threshold is configurable. Cameras in each group are assigned by the ISP to have the same exposure/gain setting.

In some examples, cameras within a given group are further grouped such that more than two groups are formed. Using a heuristic example, cameras within the given group are re-grouped by a sub-group assigning method when a group spread of a measured view brightness and/or color temperature of the cameras within the given group exceeds a threshold. The sub-group assigning method includes determining a greatest measured brightness and/or color temperature jump between consecutive cameras within the given group, the consecutive cameras having a first measured view brightness and/or color temperature and a second measured view brightness and/or color temperature within a sorted measured brightness and/or color temperature for the cameras, wherein the first measured view brightness and/or color temperature is less than the second measured view brightness and/or color temperature, and assigning the cameras within the given group with a measured view brightness and/or color temperature equal to or lower than the first measured view brightness and/or color temperature to the given group (the same group), and the cameras within the given group with a measured view brightness and/or color temperature equal to or greater than the second measured view brightness and/or color temperature to another group (a new group). In some examples, the sub-group spread is calculated by determining a least measured view brightness and/or color temperature of the cameras within the given group and a greatest measured view brightness and/or color temperature of the cameras within the given group. Cameras in each group are assigned by the ISP to have the same exposure/gain setting. In some examples, further grouping of cameras already assigned to a group is appropriate when the jump within the subgroup exceeds a threshold. In some examples, subgrouping is a feature of the system.

In some examples, other factors are taken into consideration when grouping the cameras. The dynamic grouping considers a prior grouping of the cameras, which leverages an example where a first camera in a prior group observes a similar brightness and/or color temperature as the other cameras within the first camera's group during subsequent dynamic grouping iterations. As an example, where a prior grouping impacts future grouping, consider an example where a vehicle 1 is approaching another vehicle 2, such that vehicle 2 is traveling in the opposite direction as vehicle 1, and vehicle 2 has its "bright lights" setting on the car enabled, and is approaching vehicle 1. As the front camera on vehicle 1 will only observe the bright lights of vehicle 2 for only a few seconds, instead of assigning the front camera of vehicle 1 to a different group than the other 3 cameras, the grouping will take into consideration that just before observing the bright lights setting (e.g., 5 seconds before observing the bright lights setting), the cameras were assigned to the same group, and will thus not group the cameras into different groups. In the example, a time threshold of 5 seconds is implemented. Also, in the example, prior grouping of the cameras is one factor to consider when selecting which cameras are to be grouped together. Another example where considering the prior grouping is useful is by leveraging historical statistics. Historical statistics of prior groupings of the cameras may show that some cameras are grouped together more often, and thus the next grouping would use that as a factor (e.g., use of a weighted average) to consider the next grouping. As a further example, the grouping considers the relative location of the cameras, such that the grouping considers the cameras with overlapping field-of-view (FOV) (e.g., cameras with overlapping FOV are permitted to be in the same group—a constraint such as this curtails complexity with the heuristic that cameras adjacent to other cameras are likely to have a similar brightness and/or color temperature view measure). In other examples, the grouping groups together cameras with non-overlapping field-of-view.

At 1306, an exposure history for each group is updated, and an exposure/gain setting lock for each group is updated. The group exposure history and the lock are maintained to facilitate group exposure continuity, smoothness, and fast response. The group exposure history is, in an example, used for detecting sudden and large scene brightness changes. As an implementation example, in addition to a threshold for brightness and/or color temperature variance, a second threshold, namely a time threshold is included such that cameras are regrouped if a brightness and/or color temperature is observed during a specific time period that exceeds the time threshold. For example, in some scenarios, a different brightness and/or color temperature of a camera is observed for a few minutes (the car is passing through a tunnel). In some examples, such scenarios mean that the brightness and/or color temperature measure is temporary and will revert back to a historically more consistent brightness and/or color temperature metric after the few minutes have passed. Similarly, a group exposure lock is used in some examples for avoiding unwelcomed exposure adjustment due to small and/or transient scene changes. In some examples, the group exposure/gain setting is unlocked (allowed to change) when large camera view brightness and/or color temperature change over a particular threshold time is observed. In other examples, group exposure/gain setting is locked (such that the exposure/gain setting does not change) when the camera view brightness and/or color temperature changes over a particular threshold time are small (e.g., one of the cameras temporarily observes a shadow of a tree). At 1308, the ISP selects the camera exposure for each group. A new exposure of each camera is selected when the group exposure is unlocked. However, before changing the camera exposure for each group, the group exposure history and the lock information is consulted by the ISP. In some examples, the group exposure history is a factor considered by the grouping as the grouping determines that if a group had one exposure setting in the past, a similar exposure setting is appropriate if a time threshold from the time of setting the exposure to the time of observing a new phenomenon has not been exceeded (consider the "bright lights" and tunnel examples, as described above). For example, in response to exceeding the time threshold, a camera's exposure setting is unlocked so that the camera's exposure is changed. Furthermore, in some examples, the new exposure is be selected based on a predefined view brightness or color temperature target. In some examples, a predefined view brightness or color temperature target is estimated online or offline using a statistical, engineering or mathematical model. At 1310, a synthesized image (e.g., the rendered synthesized image 110 of FIG. 1, the synthesized scene image 308 of FIG. 3, and/or the rendered synthesized image 600 of FIG. 6) is rendered by a system on a chip (SoC) (e.g., the SoC 102 of FIG. 1, the SoC 202 of FIG. 2, and/or the SoC 302 of FIG. 3) to a display (e.g., the display 228 of FIG. 2 and/or the display terminal 306 of FIG. 3).

Figure 14:
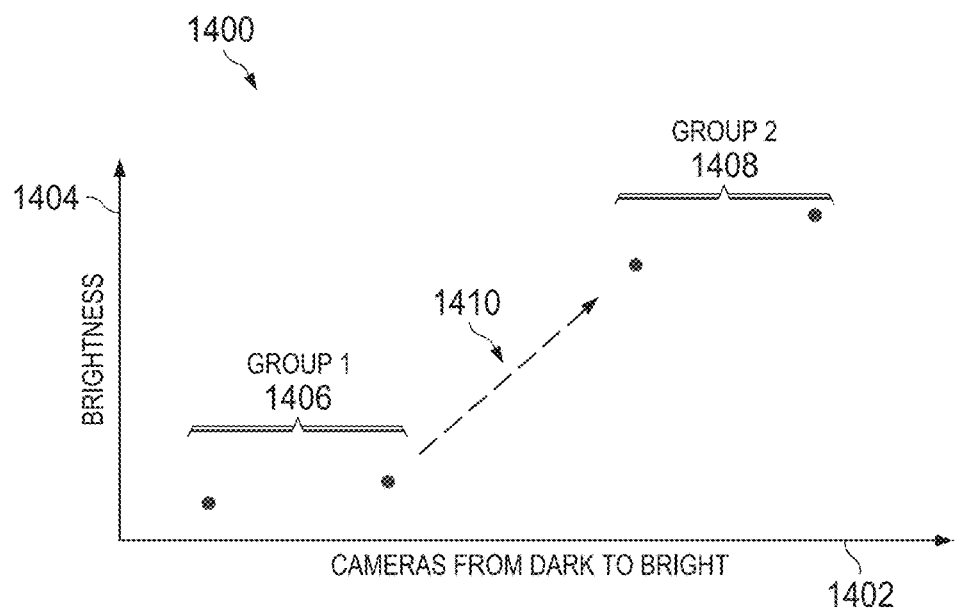
FIG. 14 is a graphical illustration of an example dynamic camera grouping.

FIG. 14 is a graph 1400 of an example dynamic camera grouping using a heuristic in an image processing system such as the image processing system 100 of FIG. 1, the image processing system 200 of FIG. 2, and/or the image processing system 300 of FIG. 3. The dynamic grouping is implemented by, for example, the image signal processor (ISP) 104 of FIG. 1, the ISP 204, or the ISP 304. The estimated view brightness of the cameras is provided (in this example, brightness includes a measure of color temperature, as well). Along the horizontal axis 1402 (in this example, the horizontal axis is labeled "Cameras from dark to bright") of the graph 1400, the cameras (e.g., the cameras 105 of FIG. 1, the cameras 205 of FIG. 2, or the cameras 505 of FIG. 5) are ordered from dark to bright. The cameras are plotted vertically along the vertical axis 1404 (in this example, the vertical axis is the axis labeled "Brightness") based on their brightness. In FIG. 14, while the vertical axis is labeled "Brightness", in some examples the cameras are sorted based on their color temperature, or based on a combination of the measured view brightness and/or the measured view color temperature. The label "Brightness" thus incorporates a notion of color temperature in addition to brightness, as does "Cameras from dark to bright" as incorporating a sort from the lowest color temperature to the highest color temperature. If the spread of the camera view brightness (e.g., the difference between the highest observed view brightness and the lowest observed view brightness) is lower than a predefined threshold, the cameras are assigned into one group with a uniform exposure/gain setting. If the variance of the cameras' view brightness is above the predefined threshold, the highest view brightness jump (delta) in the sorted view brightness of the cameras is determined. As explained with respect to FIG. 13, the term "jump" corresponds to the difference between the measured view brightness and/or color temperature of consecutive cameras (when the cameras have been sorted in order from the darkest measured view brightness and/or color temperature to the brightest view measured brightness and/or color temperature). In this example and without loss of generality, assuming that the highest view brightness jump in the sorted view includes two cameras with measured view brightness B1 and B2, such that B2>B1, the cameras are assigned to groups such that the cameras with a measured view brightness less than or equal to B1 are assigned to one group, while cameras with a measured view brightness greater than or equal to B2 are assigned to a different group. In the graph 1400, the brightness jump 1410 is shown between the camera with the highest view brightness in Group 1 1406, and the camera with the lowest view brightness in Group 2 1408.

In some examples, more than one jump is determined, for example by assigning the cameras in FIG. 4 into three groups rather than two groups using the method described in FIG. 13 at 1304. As an example, a highest brightness jump (delta) in the sorted view brightness of the cameras within the group is determined and, without loss of generality, assuming that the highest view brightness jump in the sorted view includes two cameras within the same group with measured view brightness B2 and B3, such that B3>B2, the cameras are assigned to groups such that the cameras with a measured view brightness less than or equal to B2 are assigned to one group, while cameras with a measured view brightness greater than or equal to B3 are assigned to a different group.

Figure 15:
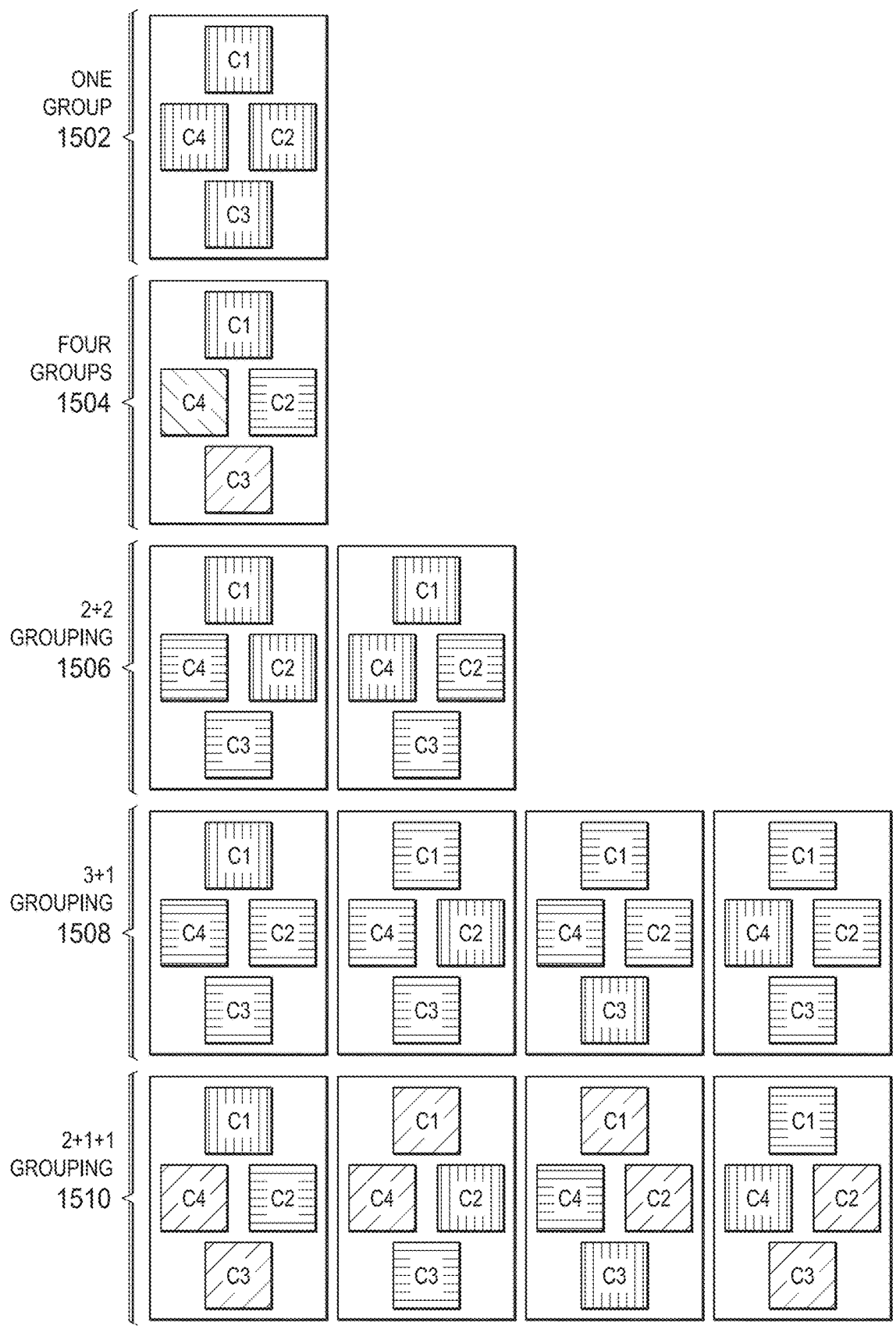
FIG. 15 illustrates example ways cameras are considered and grouped using an exhaustive search when there are four cameras arranged in a loop structure.

FIG. 15 illustrates, in an example, the different ways cameras are considered and grouped using an exhaustive search within an image processing system (e.g., the image processing system 100 of FIG. 1, the image processing system 200 of FIG. 2, and/or the image processing system 300 of FIG. 3) when there are four cameras arranged in a loop structure. The grouping is performed by, for example, the ISP 104 of FIG. 1, the ISP 204 of FIG. 2, and/or the ISP 304 of FIG. 3. The types of grouping shown by the example depicted in FIG. 15 constrains camera grouping such that just adjacent cameras are grouped together (though this constraint is in some examples relaxed). In examples with four cameras, there are five different scenarios, namely one group 1502 containing the four cameras, four groups 1504 with one camera in each group, a 2+2 grouping 1506 (two allowable ways), a 3+1 grouping 1508 (four allowable ways), and a 2+1+1 grouping 1510 (four allowable ways). Thus, in this example, there are a total of 12 different ways the cameras are allowed to be grouped. An exhaustive dynamic grouping method computes a cost function for each of the 12 allowable ways, and groups the cameras to curtail the cost as discussed below with respect to FIG. 16, FIG. 17, and FIG. 18.

Figure 16:
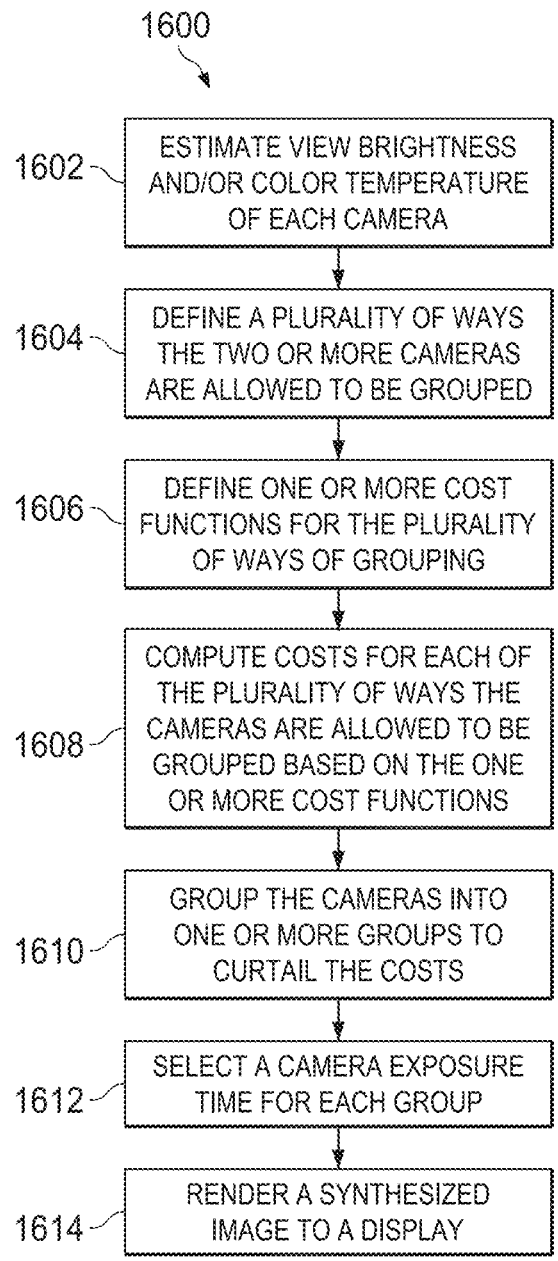
FIG. 16 is an example method to implement an image processing system by dynamically grouping cameras using an exhaustive search.

FIG. 16 is an example method 1600 to implement an image processing system (e.g., the image processing system 100 of FIG. 1, the image processing system 200 of FIG. 2, and/or the image processing system 300 of FIG. 3) by dynamically grouping cameras using an exhaustive search. The exhaustive search dynamic camera grouping is performed by an image signal processor (ISP), for example, the ISP 104 of FIG. 1, the ISP 204 of FIG. 2, or the ISP 304 of FIG. 3. An exhaustive dynamic grouping method computes a cost function for each of the ways the cameras are allowed to be grouped, and groups the cameras to curtail the cost. In this context, cost reflects how much image harmonization is given up in favor of preserving dynamic range, and vice versa. At 1602, a statistics engine (e.g., the statistics engine 106 of FIG. 1 and/or the statistics engine 206 of FIG. 2) estimates the view brightness and/or the color temperature of each camera for forwarding to the ISP. In some examples, just the view brightness of each camera is estimated, or just the color temperature of each camera is estimated. In some examples, estimating the view brightness and/or color temperature of each camera includes estimating an average view brightness and/or color temperature over a specific time period of each camera. Camera image brightness is affected by the camera exposure, and the brightness and of the view. At the same scene, in some examples, a higher camera exposure results in higher image brightness. However, the current camera exposure and current image brightness are parameters of the system. Thus, in some examples, the view (scene) brightness is estimated from the current camera image brightness and/or the current camera exposure (e.g., by assuming an approximately linear relationship). Exposure and image color temperature are substantially independent. Moreover, as noted, color temperature references the color of the light source at the scene. Thus, if two camera views observe significantly different color temperatures, in some examples the ISP (such as the ISP 104 of FIG. 1, the ISP 204 of FIG. 2, and/or ISP 304 of FIG. 3) applies different white balance gains to reduce the color difference.

At 1604, the plurality of ways the two or more cameras are allowed to be grouped is defined. In the example shown in FIG. 15, there are 12 allowable ways (if the cameras in the same group are to be adjacent). However, at 1604, in some examples additional constraints are added, such that a subset of the allowable ways is removed (e.g., remove groups such as four groups 1504 with one camera in each group). At 1606, one or more cost functions for the plurality of ways of grouping are defined. In some examples, the cost functions weigh a cost for non-uniform brightness and/or color temperature within groups, and a cost for low brightness and/or color temperature change across groups. In one example, the one or more cost functions for the grouping is a plurality of cost functions including a first cost function that defines a cost for non-uniform brightness and/or color temperature within the groups, and a second cost function that defines a cost for brightness and/or color temperature change across the groups. At 1608, the costs for each of the plurality of ways the cameras are allowed to be grouped (e.g., seven ways of grouping) are computed based on the one or more cost functions.

At 1610, the ISP groups each of the cameras into one or more groups to curtail the costs. As one example, to select the group for each camera, the ISP selects the grouping arrangement that curtails the costs to a lowest level (e.g., the lowest cost grouping). Additionally, a threshold is defined for changing the grouping. If the reduction of cost is greater than the threshold, the ISP changes the grouping of the cameras to curtail the costs. If the reduction of cost is less than the threshold, the ISP elects not to change the current grouping of the cameras. In some examples, the grouping to curtail the costs is based on a prior grouping of the cameras (e.g., refer to the "bright lights" example, discussed above), group exposure history (e.g., refer to the "tunnel" example discussed above), and/or a relative location of the cameras (e.g., cameras with non-overlapping fields of view in fact belong to the same group). At 1612, the ISP selects a camera exposure for each group, wherein one or more cameras within a given one of the groups has a same camera exposure. At 1614, a synthesized image (e.g., the rendered synthesized image 110 of FIG. 1, the synthesized scene image 308 of FIG. 3, and/or the rendered synthesized image 600 of FIG. 6) is rendered to a display (e.g., the display 228 of FIG. 2 and/or the display terminal 306 of FIG. 3).

In some examples, the synthesized image is rendered by a geometric transformation engine such as the geometric transformation engine 108 of FIG. 1 and/or the geometric transformation engine 208 of FIG. 2. In other examples, the synthesized image is rendered by an SoC, such as the SoC 102 of FIG. 1 and/or the SoC 202 of FIG. 2. The systems and methods disclosed herein apply to technological solutions in which image preprocessing occurs in one SoC, while the actual image synthesis occurs in another SoC. Thus, the system and method disclosed herein apply to image preprocessing in which dynamic grouping is used to assign an exposure gain/setting to cameras within the same group, irrespective of whether the image synthesis occurs in the same part or system or not. At the same time, the systems and method disclosed herein apply to technological solutions in which the image preprocessing and dynamic grouping and image synthesis occur in the same SoC.

Figure 17:
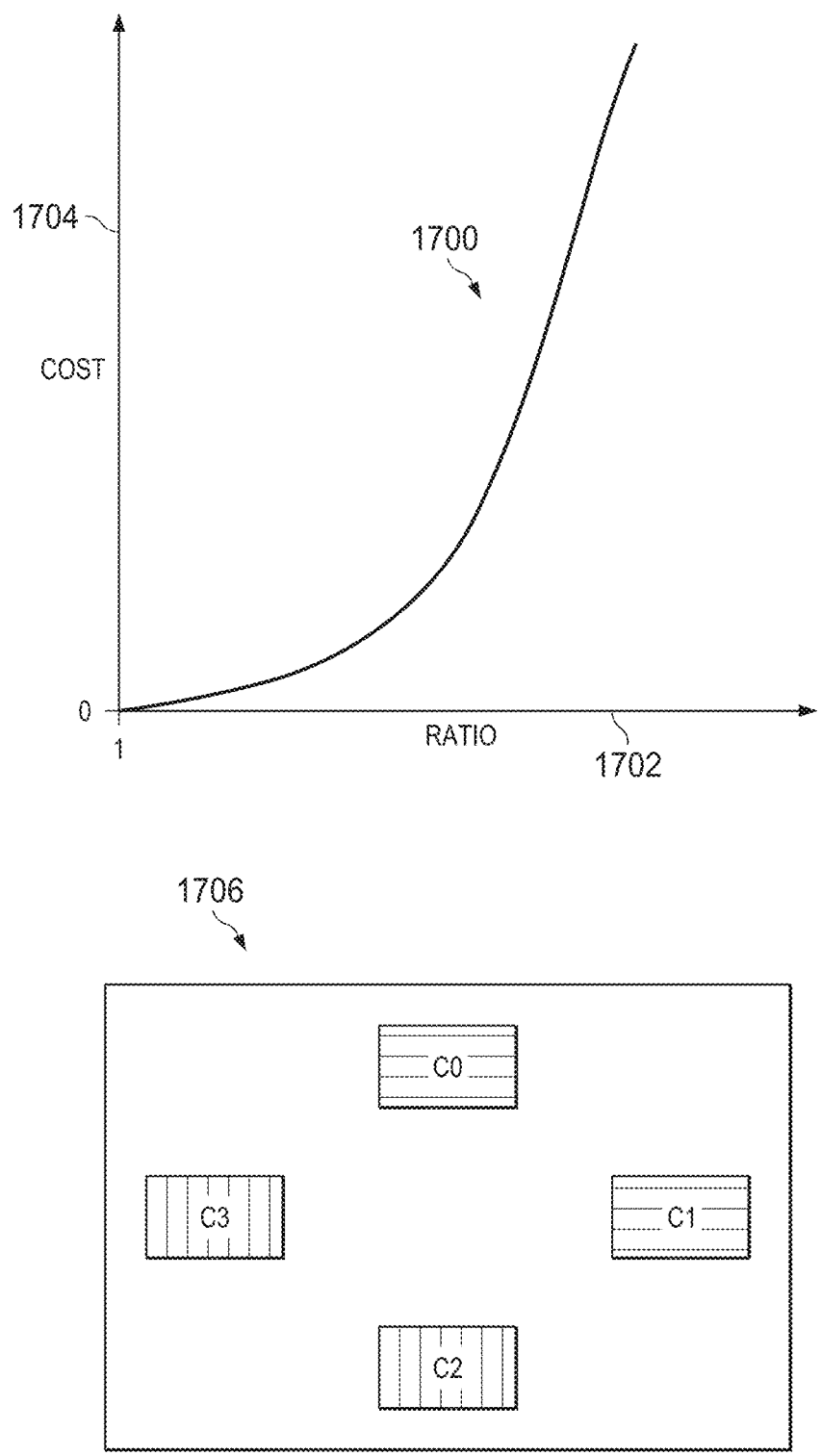
FIG. 17 illustrates a graph plotting cost as a function of ratio of brightness and/or color temperature.

FIG. 17 illustrates a graph 1700 plotting cost as a function of the ratio of brightness and/or color temperature in one group represented in a four camera image processing system illustrated in the diagram 1706. Accordingly, in at least one example, the graph 1700 represents an output of a cost function for the diagram 1706. The cost function shown in FIG. 17 is, in an example, the one or more cost functions defined at 1606 in FIG. 16. In particular, as mentioned with respect to FIG. 16 (see at 1606), the cost for non-uniform brightness and/or color temperature within groups is for example used to compute (or be a factor of) an overall cost. The grouping of cameras is given during the exhaustive search stage. For example, in the diagram 1706, two of the cameras (e.g., C0 and C1) belong to one group, while the other two cameras (e.g., C2 and C3) belong to another group.

For the present example, it is presumed that the view brightness/color temperature of the cameras C0, C1, C2 and C3 are B0, B1, B2, and B3 respectively. For the (C2, C3) group, the ratio, r of the brightest/highest color temperature view to the darkest/lowest color temperature view is given by Equation 2.

$$\frac{\max(B2, B3)}{\min(B2, B3)} = r \qquad \text{Equation 2}$$

In some examples, with more cameras in the group, the ratio, r is defined in a manner similar to Equation 2. If the group has a single camera, the ratio is defined to be 1. A low ratio around 1 (less than 2, for example) implies uniform brightness and/or color temperature in the group which means that the cameras are appropriately in the same group. A high ratio, namely a ratio greater than or equal to 4 (for example) implies non-uniform brightness in the group such that the cameras should probably not be in the same group. In some examples, the cost 1704 for non-uniform brightness and/or color temperature in one group is defined as a function of the ratio 1702 that is close to 0 for a small ratio around 1 and increases for larger ratio values, as shown in FIG. 17. In some examples, the specific shape of the cost function is decided empirically. In some examples, a linear function or other higher-order function for cost function is defined. Furthermore, in some examples, the overall cost of the groups is the sum of the cost of each group. Moreover, the cost function shown in FIG. 17 is extendable to include just a brightness measure or just a color temperature measure.

FIG. 18 illustrates a graph 1800 plotting cost 1804 as a function of ratio 1802 of low brightness and/or color temperature change across groups, represented in a four camera image processing system illustrated in diagram 1806. Accordingly, in at least one example, the graph 1800 represents an output of a cost function for the diagram 1806. The cost function shown in FIG. 18 is, in an example, the one or more cost functions defined at 1606 in FIG. 16. As mentioned with respect to FIG. 16 (see at 1606), a cost for low brightness and/or color temperature change across groups is used, for example, to compute (or is a factor of) an overall cost.

FIG. 18 depicts an example of how to define a cost for low brightness and/or color temperature change across groups. For the present example, it is presumed that a four camera image processing system is being implemented. The grouping of cameras is shown in the diagram 1806. In this example, it is further presumed that two of the cameras (e.g., C0 and C1) belong to one group, while the other two cameras (e.g., C2 and C3) belong to another group; and that the view brightness/color temperature of the cameras are B0, B1, B2, and B3 respectively. There is a group boundary between C0 and C3. In some examples, the brightness/color temperature ratio for this boundary between the cameras is defined by Equation 3.

$$\max\left(\frac{B0}{B3}, \frac{B3}{B0}\right) = r \qquad \text{Equation 3}$$

A low ratio around 1 (or less than 2, for example) implies low brightness and/or color temperature change across the boundary (e.g., C0 and C3 have similar view brightness and/or color temperature and should probably be in the same group). A high ratio implies high brightness and/or color temperature change across the boundary (e.g., C0 and C3 have large view brightness and/or color temperature difference and should probably be in different groups). In some examples, the cost function for low brightness and/or color temperature for one group boundary is defined as a function of the above ratio that is large for small ratio 1802 around 1 and decreases to near 0 for larger ratio values as shown in FIG. 18. As shown in FIG. 18, as the ratio 1802 increases (meaning the difference in brightness/color temperature between groups is larger), the cost 1804 (the cost to the system for keeping the groups different) decreases and vice versa. In some examples, the specific shape of the function is decided empirically. In some examples, a linear function or other higher-order function for cost function is defined. Furthermore, in some examples, the cost is defined as the sum of the costs for low brightness and/or color temperature change across groups for the universe of group boundaries. Moreover, the cost function shown in FIG. 18 is extendable to include just a brightness measure or just a color temperature measure.

What have been described above are examples of the disclosure. It is not possible to describe every conceivable combination of components or method for purposes of describing the disclosure, but many further combinations and permutations of the disclosure are possible. Accordingly, the disclosure is intended to embrace all such alterations, modifications, and variations that fall within the scope of this application, including the appended claims.

What is claimed is:

1. A system on a chip (SoC), comprising:
   an image signal processor (ISP), the ISP being configured to:
   receive a first image signal from a first camera and a second image signal from a second camera;
   group the first image signal and the second image signal based on a brightness or color temperature recorded by the first and second cameras;
   and
   a statistics engine, the statistics engine configured to:
   receive the first image signal, second image signal, and statistics related to the first and second image signals from the ISP; and
   estimate a measurement of brightness or color temperature based on the first and second image signals.

2. The SoC of claim 1, further comprising a geometric transformation engine configured to perform a geometric transformation of the first and second image signals received from the ISP to render a synthesized image of the first and second image signals.

3. The SoC of claim 1, wherein the statistics engine is further configured to determine a total dynamic range of a setting corresponding to the first and second image signals.

4. The SoC of claim 1, wherein the ISP is further configured to assign the first image signal and the second image signal into one group in response to determining that the brightness or color temperature for the first image signal and the second image signal is lower than a predefined threshold.

5. A method, comprising:
   estimating, by a statistics engine, a brightness and/or color temperature of each camera within an image processing system having two or more cameras;
   grouping, by an image signal processor (ISP), the two or more cameras into one or more groups based on a spread of the estimated brightness and/or color temperature among the two or more cameras, wherein the spread is calculated by determining a least measured brightness and/or color temperature of the two or more cameras and a greatest measured brightness and/or color temperature of the two or more cameras; and
   selecting, by the ISP, a camera exposure/gain setting for each group, wherein one or more cameras within a given one of the groups has a same camera exposure/gain setting.

6. The method of claim 5, further comprising rendering, to a display, a synthesized image that blends images captured by the cameras of the image processing system.

7. The method of claim 5, wherein the two or more cameras are assigned to the same group in response to the spread of the estimated brightness and/or color temperature of the two or more cameras being lower than a predefined threshold.

8. The method of claim 5, wherein the cameras are assigned to different groups by a group-assigning method in response to the spread of the estimated brightness and/or color temperature of the cameras being above a threshold, the group-assigning method comprising:
   determining a greatest measured brightness and/or color temperature difference between two consecutive cameras, the two consecutive cameras having a first measured brightness and/or color temperature and a second measured brightness and/or color temperature, respectively, within a sorted measured brightness and/or color temperature for the cameras within the group, wherein the first measured brightness and/or color temperature is less than the second measured brightness and/or color temperature; and
   assigning the cameras with a measured brightness and/or color temperature equal to or lower than the first measured brightness and/or color temperature to a first group, and the cameras with a measured brightness and/or color temperature equal to or greater than the second measured brightness and/or color temperature to a second group.

9. The method of claim 8, wherein cameras within the second group are further grouped by a subgroup assigning method in response to a subgroup spread of a measured brightness and/or color temperature of the cameras within the second group exceeding a subgroup spread threshold, the subgroup assigning method comprising:
   determining a greatest measured brightness and/or color temperature difference between two consecutive cameras within the second group, the two consecutive cameras within the second group having a third measured brightness and/or color temperature and a fourth measured brightness and/or color temperature, respectively, within a sorted measured brightness and/or color temperature for the cameras within the second group, wherein the third measured brightness and/or color temperature is less than the fourth measured brightness and/or color temperature; and assigning the cameras within the second group with a measured brightness and/or color temperature equal to or lower than the third measured brightness and/or color temperature to the second group, and the cameras within the group with a measured brightness and/or color temperature equal to or greater than the fourth measured brightness and/or color temperature to a third group;

wherein the subgroup spread is calculated by determining a least measured brightness and/or color temperature of the cameras within the second group and a greatest measured brightness and/or color temperature of the cameras within the second group.

10. The method of claim 5, wherein the camera exposure/gain setting for a group is locked by the ISP to prevent one or more cameras from being reassigned to a different group, and unlocked in response to a change in the estimated camera brightness and/or color temperature for one of the cameras within the group being observed to be higher than a lock threshold value during a predefined amount of time.

11. The method of claim 5, wherein the grouping is further based on a prior grouping of the cameras, a group exposure/gain history, and a relative location of the cameras, and wherein setting the camera exposure/gain setting for each group is based on a predefined brightness and/or color temperature target.

12. A method, comprising:
estimating, by a statistics engine, a brightness and/or color temperature of each camera within an image processing system with two or more cameras;
defining, by an image signal processor (ISP), a plurality of ways that the two or more cameras are allowed to be grouped;
defining, by the ISP, one or more cost functions for the plurality of ways of grouping;
computing, by the ISP, costs for each of the plurality of ways the cameras are allowed to be grouped based on the one or more cost functions;
grouping, by the ISP, the cameras into one or more groups to curtail the costs, wherein the costs define an extent to which image harmonization and dynamic range are balanced within a synthesized image;
selecting, by the ISP, a camera exposure/gain setting for each group, wherein one or more cameras within a given one of the groups has a same camera exposure/gain setting; and
rendering, to a display, the synthesized image that blends images captured by the cameras of the image processing system.

13. The method of claim 12, wherein the statistics engine estimates a measurement of image brightness and/or color temperature for each of the two or more cameras from a current camera image brightness and/or color temperature and a current camera exposure/gain setting by linearizing a relationship between the current camera image brightness and/or color temperature and the current camera exposure/gain setting.

14. The method of claim 12, wherein defining the plurality of ways that the two or more cameras are allowed to be grouped includes allowing cameras with non-overlapping field of view to be in the same group.

15. The method of claim 12, wherein the one or more cost functions for the grouping is a plurality of cost functions comprising:
a first cost function that defines a first cost for non-uniform brightness and/or color temperature within the groups; and
a second cost function that defines a second cost for brightness and/or color temperature change across the groups.

16. The method of claim 15, wherein the first cost function that defines the first cost for non-uniform brightness and/or color temperature within the groups is determined by a first cost function method including:
determining a ratio of a maximum of the brightness and/or color temperature of the cameras to a minimum of the brightness and/or color temperature of the cameras in a group; and
defining a function of the ratio that is proportional to the ratio.

17. The method of claim 15, wherein the second cost function that defines the second cost for brightness and/or color temperature change across the groups is determined by a second cost function method including:
determining a ratio between adjacent cameras that are in different groups as a maximum of the brightness and/or color temperature of a first camera to the brightness and/or color temperature of a second camera, and the brightness and/or color temperature of the second camera to the brightness and/or color temperature of the first camera; and
defining a function of the ratio that is inversely proportional to the ratio.

* * * * *